US012753765B2

(12) United States Patent
Blaylock et al.

(10) Patent No.: US 12,753,765 B2
(45) Date of Patent: Oct. 6, 2026

(54) FLUID PUMP AND METHOD OF MANUFACTURING SAME

(71) Applicant: Temco Industrial, LLC, Brenham, TX (US)

(72) Inventors: Bryan Collins Blaylock, Brenham, TX (US); Josh Louis Leber, Brenham, TX (US)

(73) Assignee: Temco Industrial, LLC, Brenham, TX (US)

( * ) Notice: Subject to any disclaimer, the term of this patent is extended or adjusted under 35 U.S.C. 154(b) by 0 days.

(21) Appl. No.: 19/455,577

(22) Filed: Jan. 21, 2026

(65) Prior Publication Data

US 2026/0210361 A1 Jul. 23, 2026

Related U.S. Application Data

(63) Continuation-in-part of application No. 19/033,622, filed on Jan. 22, 2025.

(51) Int. Cl.
*F04D 3/02* (2006.01)
*F04D 29/041* (2006.01)
(Continued)

(52) U.S. Cl.
CPC ............ *F04D 3/02* (2013.01); *F04D 29/041* (2013.01); *F04D 29/046* (2013.01); *F04D 29/08* (2013.01);
(Continued)

(58) Field of Classification Search
CPC .......... F04D 3/02; F04D 13/02; F04D 13/021; F04D 13/068; F04D 25/0673; F04D 29/548
See application file for complete search history.

(56) References Cited

U.S. PATENT DOCUMENTS 1,369,382 A * 2/1921 Clarence .................. F04D 3/02 415/72
1,966,325 A * 7/1934 Welch ...................... F04D 3/02 415/72

(Continued)

FOREIGN PATENT DOCUMENTS

CN 205471254 U 8/2016
CN 114412796 A 4/2022

(Continued)

OTHER PUBLICATIONS

PCT/US2026/012041; PCT Int'l Search Report; Mailed: Jun. 2, 2026; Int'l Filing Date: Jan. 21, 2026; In't Priority Date: Jan. 22, 2025; Applicant: Temco Industrial, LLC; 3 pages.

(Continued)

*Primary Examiner* — Courtney D Heinle
*Assistant Examiner* — Behnoush Haghighian
(74) *Attorney, Agent, or Firm* — Patent Energy, LLC; Alan Roy Cordy

(57) ABSTRACT

Fluid pumps and methods of manufacturing fluid pumps are provided. The fluid pump can include an auger tube, a helical screw, an outlet end cap having a first end that defines a longitudinal bore partially therethrough a second end that defines an aperture therethrough, and an outlet tube that defines a bore therethrough in fluid communication with the longitudinal bore defined by the first end, a bearing that defines a bore therethrough, and a drive shaft secured to the helical screw. The helical screw can be disposed within the auger tube, the second end of the drive shaft can extend through the bore defined by the bearing, and the bearing can be disposed within the aperture defined by the second end of the outlet end cap.

18 Claims, 13 Drawing Sheets

(51) Int. Cl.

| | |
|---|---|
| ***F04D 29/046*** | (2006.01) |
| ***F04D 29/08*** | (2006.01) |
| ***F04D 29/52*** | (2006.01) |

(52) U.S. Cl.

CPC ........ *F04D 29/528* (2013.01); *F05D 2230/24* (2013.01); *F05D 2230/60* (2013.01); *F05D 2240/52* (2013.01); *F05D 2300/43* (2013.01)

(56) References Cited

U.S. PATENT DOCUMENTS

| | | | | |
|---|---|---|---|---|
| 2,362,922 | A * | 11/1944 | Palm | F16N 13/20 415/72 |
| 2,673,523 | A * | 3/1954 | Larson | F04D 3/02 415/72 |
| 2,744,465 | A * | 5/1956 | Springer | F04D 3/02 415/72 |
| 3,688,140 | A * | 8/1972 | Schaefer | F04D 3/02 310/87 |
| 3,807,708 | A * | 4/1974 | Jones | B01F 25/60 415/72 |
| 4,443,152 | A * | 4/1984 | Wong | F04D 29/106 415/218.1 |
| 5,295,810 | A * | 3/1994 | Heijnen | F04D 13/04 417/408 |
| 5,505,594 | A * | 4/1996 | Sheehan | F04D 13/02 415/72 |
| 5,571,001 | A * | 11/1996 | Fukuda | F04D 29/588 417/423.3 |
| 5,827,042 | A * | 10/1998 | Ramsay | F04D 29/047 415/231 |
| 5,875,882 | A | 3/1999 | Pollock | |
| 6,179,558 | B1 * | 1/2001 | Eastman, III | B01D 46/00 415/121.2 |
| 7,419,354 | B2 | 9/2008 | Zamfes | |
| 8,348,606 | B2 * | 1/2013 | Gopalan | F04D 29/2233 415/206 |
| 8,967,948 | B2 * | 3/2015 | Hashima | F04D 3/02 415/73 |
| 10,619,634 | B1 * | 4/2020 | Lundberg | F04C 15/06 |
| 11,346,347 | B2 * | 5/2022 | Smith | F04D 13/16 |
| 11,808,268 | B2 * | 11/2023 | Henton | F04D 13/068 |
| 11,994,131 | B2 * | 5/2024 | Arkwright | F04D 13/0613 |
| 12,071,961 | B1 * | 8/2024 | Galusha | B01D 35/26 |
| 12,163,524 | B2 * | 12/2024 | Henton | F04D 29/605 |
| 2003/0196952 | A1 * | 10/2003 | Kampfen | B04C 5/15 210/512.3 |
| 2009/0003986 | A1 * | 1/2009 | Lee | F04D 1/025 415/206 |
| 2020/0386233 | A1 * | 12/2020 | Smith | F04D 13/068 |
| 2021/0108641 | A1 * | 4/2021 | Arkwright | F04D 13/0613 |
| 2022/0120293 | A1 * | 4/2022 | Henton | F04D 13/068 |
| 2023/0366405 | A1 * | 11/2023 | Henton | F04D 29/445 |
| 2024/0410363 | A1 | 12/2024 | Martin et al. | |
| 2025/0052247 | A1 * | 2/2025 | Henton | F04D 29/628 |

FOREIGN PATENT DOCUMENTS

| | | | |
|---|---|---|---|
| FR | 1034480 | A | 7/1953 |
| JP | 200410246 | A | 1/2004 |
| TW | i645109 | B1 | 12/2018 |
| WO | 2008086575 | A1 | 7/2008 |
| WO | 2011048404 | A1 | 4/2011 |

OTHER PUBLICATIONS

PCT/US2026/012041; PCT Written Opinion of the Int'l Searching Authority; Mailed: Jun. 2, 2026; Int'l Filing Date: Jan. 21, 2026; In't Priority Date: Jan. 22, 2025; Applicant: Temco Industrial, LLC; 16 pages.

* cited by examiner

FLUID PUMP AND METHOD OF MANUFACTURING SAME

CROSS-REFERENCE TO RELATED APPLICATION

This Patent Application claims priority to U.S. Non-Provisional patent application Ser. No. 19/033,622, dated Jan. 22, 2025, the entire content of which is incorporated by reference herein.

FIELD

The present invention relates to fluid pumps and specifically fluid auger pumps configured to be driven by external rotary powered tools and methods of manufacturing same.

BACKGROUND

In the fluid transfer industry, fluid auger pumps are well known in the art. Typically, these pumps are manufactured from a metallic material, for example steel or aluminum and include an auger that rotates within an auger tube at a relatively slow speed. These pumps can be effective at moving fluids, but are not effective when the fluid contains significant amounts of mud or other slurry-type fluids. Further, these pumps can be bulky and heavy to handle, transport and to operate. Further, these pumps typically rotate the auger at speeds of up to several hundred RPMs and the flow rates are accordingly limited.

There is a need, therefore for a new fluid pump and method for manufacturing the same.

SUMMARY

Fluid pumps and processes for manufacturing a fluid pump are provided. In some embodiments, a fluid pump can include an auger tube that can include a first end and a second end, a helical screw that can include a first end and a second end, an outlet end cap that can include a first end that can define a longitudinal bore partially therethrough, a second end that can define an aperture therethrough, and an outlet tube that can define a bore therethrough in fluid communication with the longitudinal bore defined by the first end. The fluid pump can include a bearing that can define a bore therethrough and a drive shaft that can include a first end and a second end. The drive shaft can be secured to the helical screw. The helical screw can be configured to be disposed within the auger tube. The second end of the drive shaft can be configured to extend through the bore defined by the bearing. The bearing can be configured to be disposed within the aperture defined by the second end of the outlet end cap. The first end of the outlet end cap can be coupled to the second end of the auger tube.

In some embodiments, a fluid pump can include an auger tube that can include a first end and a second end, a helical screw having a first end and a second end, an outlet end cap that can include a first end that can define a longitudinal bore partially therethrough, a second end that can define an aperture therethrough, and an outlet tube that can include a first end in fluid communication with the longitudinal bore defined by the first end of the outlet end cap, an inlet end cap that can define a longitudinal bore therethrough and having a first end, a second end, and a plurality of stand-off feet that can define a plurality of fluid passages that permit a fluid to flow into the longitudinal bore defined by the inlet end cap when the plurality of stand-off feet can abut against a submerged surface, a first bearing and a second bearing, and an adapter that can define a shoulder. The first bearing and the second bearing can each be disposed within the aperture defined by the second end of the outlet end cap. The second end of the drive shaft can be configured to extend through the bore defined by the first bearing and the bore defined by the second bearing. The second end of the outlet end cap can define a first shoulder and a second shoulder. A first end of the adapter can be configured to be coupled to the second end of the drive shaft and can be disposed within the bore defined by the second bearing. The first bearing can be disposed between a collar of the helical screw and the first shoulder defined by the second end of the outlet end cap. The second bearing can be disposed between the second shoulder defined by the second end of the outlet end cap and the shoulder defined by the adapter. The helical screw can be formed by a first polymer injection molding process. The outlet end cap can be formed by a second polymer injection molding process. The inlet end cap can be formed by a third polymer injection molding process. The auger tube can be at least partially formed from a polymer extrusion process.

In some embodiments, a process for manufacturing a fluid pump can include forming an auger tube from a first polymer, forming a helical screw from a second polymer, forming an outlet end cap from a third polymer, and obtaining a drive shaft that can include a first end and a second end. The outlet end cap can include a first end that defines a longitudinal bore partially therethrough, a second end that defines an aperture therethrough, and an outlet tube having a first end in fluid communication with the longitudinal bore defined by the first end of the outlet end cap. The process can include securing the drive shaft to the helical screw, disposing a bearing that defines a bore therethrough within the aperture defined by the second end of the outlet end cap, disposing the helical screw within the auger tube such that the second end of the drive shaft extends through the bore defined by the bearing, and coupling the first end of the outlet end cap to a second end of the auger tube.

BRIEF DESCRIPTION OF THE DRAWINGS

The various aspects and advantages of the preferred embodiment of the present invention will become apparent to those skilled in the art upon an understanding of the following detailed description of the invention, read in light of the accompanying drawings which are made a part of this specification.

DETAILED DESCRIPTION

Figure 1:
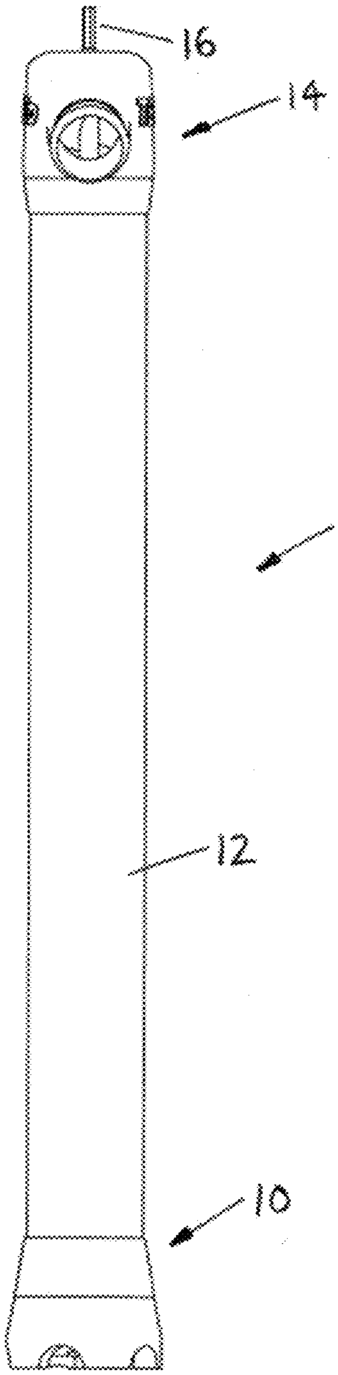
FIG. 1 depicts a front elevation view of an illustrative fluid pump according to one or more embodiments described.

A detailed description will now be provided. Each of the appended claims defines a separate invention, which for infringement purposes is recognized as including equivalents to the various elements or limitations specified in the claims. Depending on the context, all references to the "invention", in some cases, refer to certain specific or preferred embodiments only. In other cases, references to the "invention" refer to subject matter recited in one or more, but not necessarily all, of the claims. It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the Figures. Moreover, the formation of a first feature over or on a second feature in the description that follows can include embodiments in which the first and second features are formed in direct contact and also can include embodiments in which additional features are formed interposing the first and second features, such that the first and second features are not in direct contact. The exemplary embodiments presented below may be combined in any combination of ways, i.e., any element from one exemplary embodiment may be used in any other exemplary embodiment, without departing from the scope of the disclosure. The figures are not necessarily drawn to scale and certain features and certain views of the figures can be shown exaggerated in scale or in schematic for clarity and/or conciseness.

Further, the term "or" is intended to encompass both exclusive and inclusive cases, i.e., "A or B" is intended to be synonymous with "at least one of A and B," unless otherwise expressly specified herein. The indefinite articles "a" and "an" refer to both singular forms (i.e., "one") and plural referents (i.e., one or more) unless the context clearly dictates otherwise. The terms "up" and "down"; "upward" and "downward"; "upper" and "lower"; "upwardly" and "downwardly"; "above" and "below"; and other like terms used herein refer to relative positions to one another and are not intended to denote a particular spatial orientation since the apparatus and methods of using the same may be equally effective at various angles or orientations.

The term "monolithic" means that a device, structure, component, or body that is formed or produced as or from a single piece of material, or in a single manufacturing process without first producing separate parts that are subsequently joined to one another. For example, a body that is machined from a single piece of material, a body that is formed by a single molding process, or a body that is at least partially formed from a single casting process is monolithic. The term "monolithic" also means a device, structure, component, or other body that is at least partially formed from a plurality of subcomponents that are then joined, fused or otherwise connected to one another without the use of a dissimilar material, for example, fasteners, glues, epoxies, or other bonding agents to join the subcomponents to one another. Thus, if two subcomponents of a body are formed of a thermoplastic material and are subsequently heated to join the two components to one another, the resulting component is monolithic.

The term "bond" or "bonded" means joining two or more subcomponents to one another with the use of a bonding material that is different than the material used to form the two subcomponents. For example, two subcomponents can be said to be bonded to one another if the two subcomponents are bonded to one another with an epoxy, a glue, or are welded to one another with a material that is different than the material of which the two subcomponents are formed. Such a body is not monolithic. Further, if two subcomponents are assembled to one another with a plurality of fasteners, the resulting component is not monolithic.

It should also be understood that the phrases "disposed therein", "disposed within", "disposed on" and other similar phrases, when describing a component, e.g., a first component, describe the first component as being at least partially arranged, located, placed, or positioned in, within, or on a second component The term "Polymer Injection Molding" is defined as a high-pressure manufacturing process where a melted polymer resin is injected into a mold cavity, solidifies into a specific shape, and then the finished part is ejected.

The term "thermoplastic" means a type of polymer that softens when heated, allowing it to be molded or shaped, and then hardens upon cooling, a reversible process.

The term "thermoset" means a type of polymer that hardens irreversibly when heated or cured, forming strong, cross-linked bonds that create a rigid, infusible material.

Figure 1A:
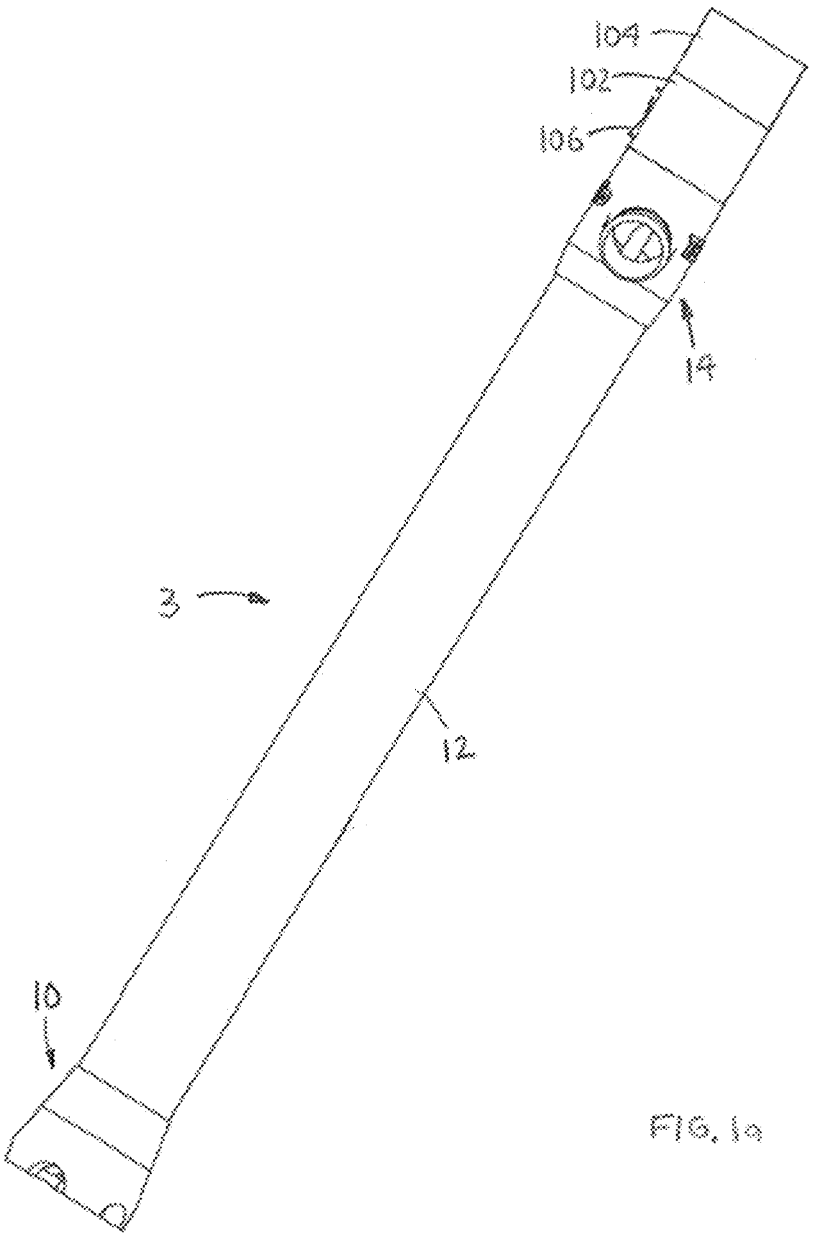
FIG. 1*a* depicts a front elevation view of the fluid pump shown in FIG. 1 that includes an optional electric motor.
Figure 2:
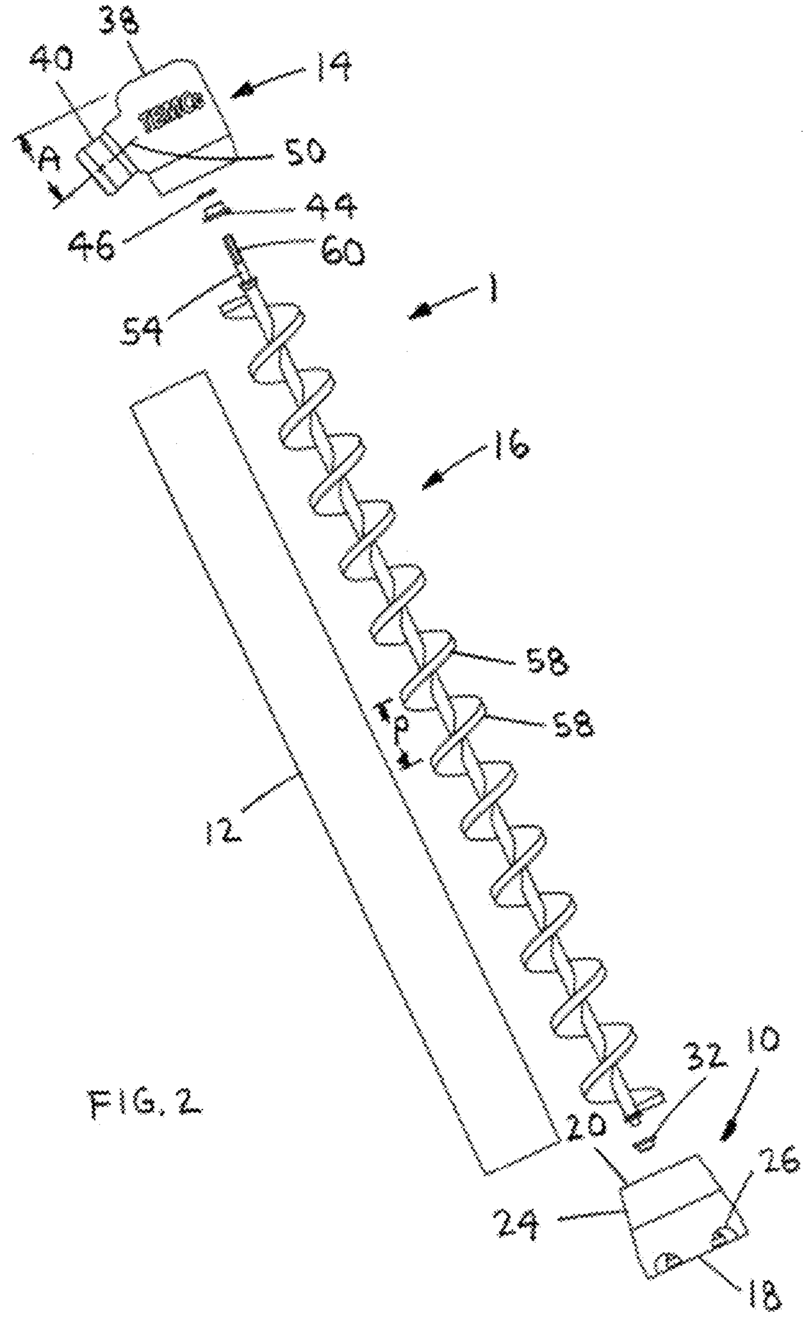
FIG. 2 depicts a side elevation view of the fluid pump shown in FIG. 1 in a disassembled configuration.
Figure 2A:
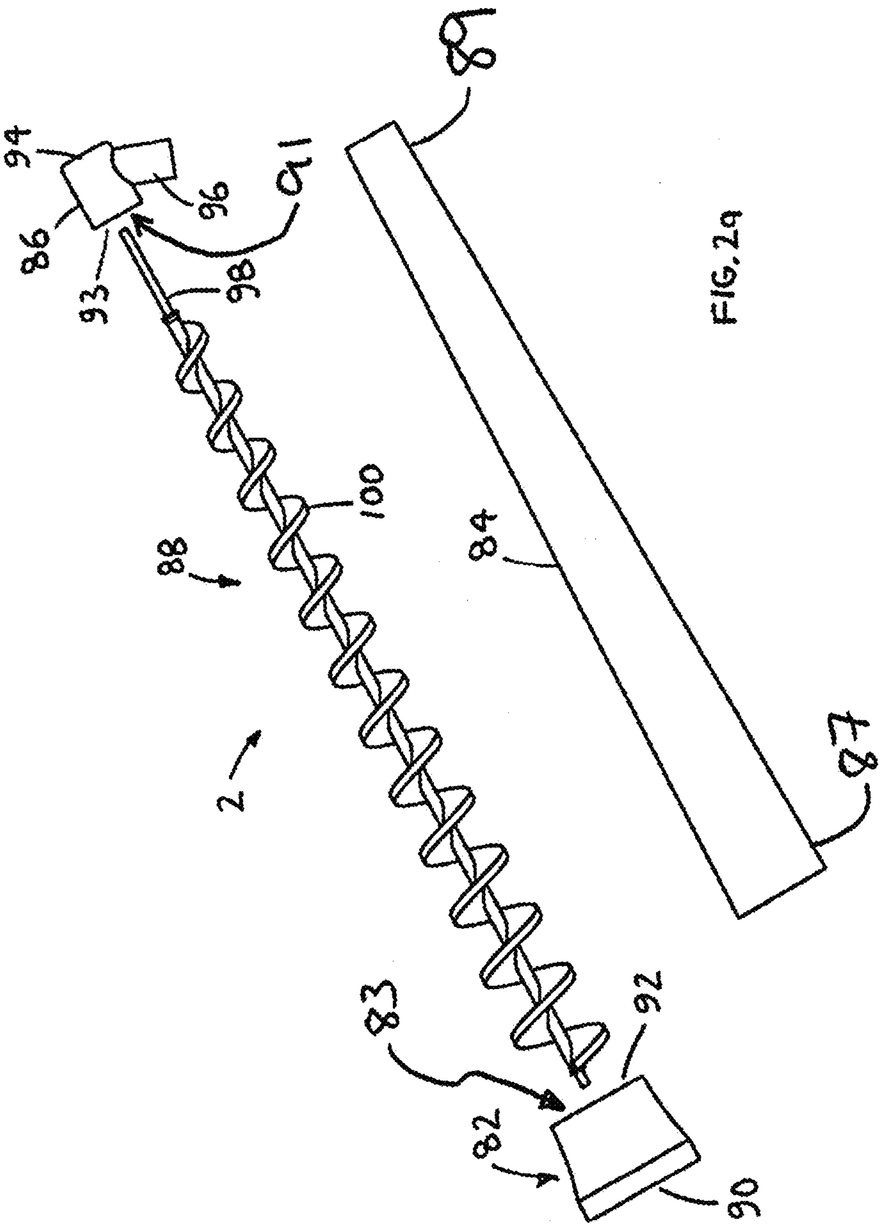
FIG. 2*a* depicts a side elevation view of another illustrative fluid pump in a disassembled configuration that can include a tapered fluid auger and a tapered auger tube according, to one or more embodiments described.
Figure 3:
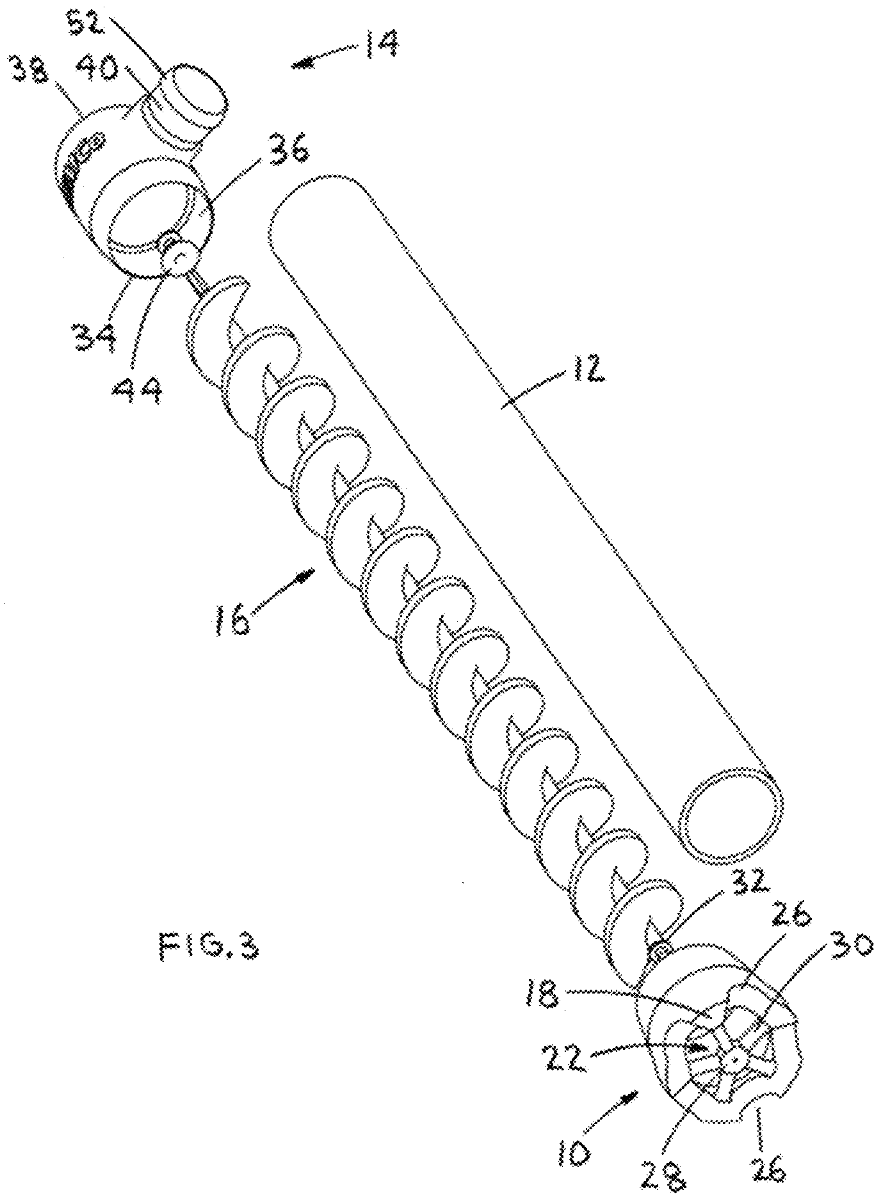
FIG. 3 depicts a perspective view of the fluid pump shown in FIG. 1.
Figure 3A:
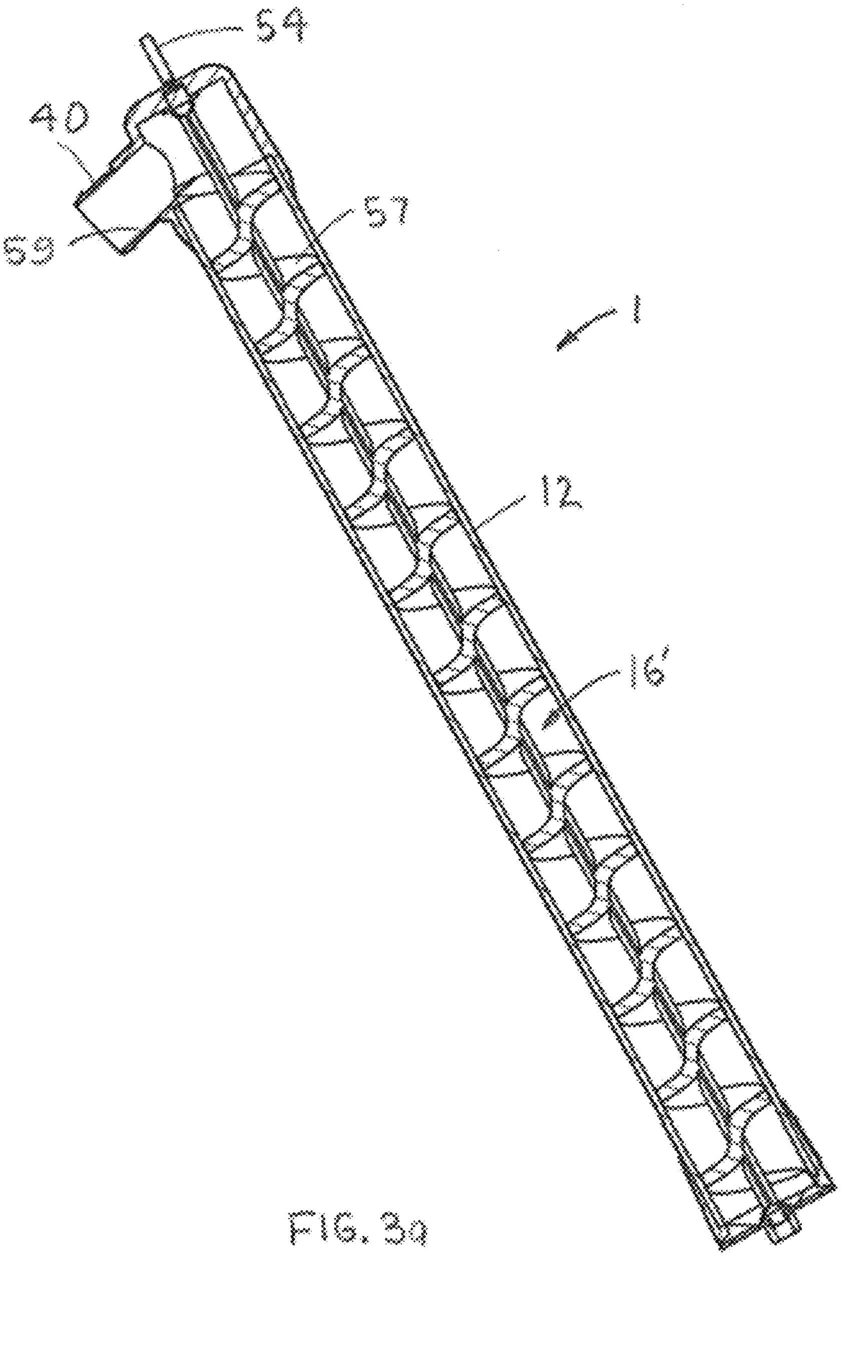
FIG. 3*a* depicts a cross-sectional view of the fluid pump shown in FIG. 1.

FIG. 1 depicts a front elevation view of an illustrative fluid pump 1. FIG. 1*a* depicts a front elevation view of the fluid pump 1 that can include an optional electric motor 102 and an optional battery 104. FIG. 2 depicts a side elevation view of the fluid pump 1 shown in FIG. 1 in a disassembled configuration. FIG. 2*a* depicts a side elevation view of another illustrative fluid pump 2 in a disassembled configuration that can include a tapered fluid auger 88 and a tapered auger tube 84. FIG. 3 depicts a perspective view of the fluid pump 1 shown in FIG. 1. FIG. 3*a* depicts a cross-sectional view of the fluid pump shown in FIG. 1. Referring to FIGS. 1, 1*a*, 2, 2*a*, 3, and 3*a*, the fluid pump 1 can include an optional inlet cap 10, an auger tube 12, an outlet end cap 14 and a fluid auger 16. The inlet end cap 10 can include an inlet tube end 18, an inlet inner perimeter 20, a retention member 22 and an opposing inlet end 24. The inlet inner perimeter 20 can be sized to receive an outer perimeter of the auger tube 12. The inlet tube end 18 can include or a define plurality of cavities 26 that can be formed in a surface thereof for pulling water into the inlet inner perimeter 20. The bearing retention member 22 can include a bearing retention portion 28 and a plurality of mounting spokes 30. The plurality of mounting spokes 30 can extend outward from an outer perimeter of the bearing retention portion 28 and can be engaged with the inlet inner perimeter 20 of the inlet end cap 10. The inlet end cap 10 can be fabricated or at least partially formed from a single piece of material. A bearing bore can be formed in the bearing retention portion 28 to retain or receive a blind inlet bearing 32.

Figure 6:
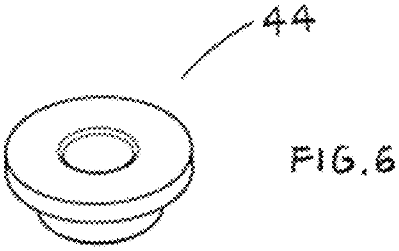
FIG. 6 depicts a perspective view of an illustrative outlet bearing of an illustrative fluid pump according to one or more embodiments described.
Figure 7:
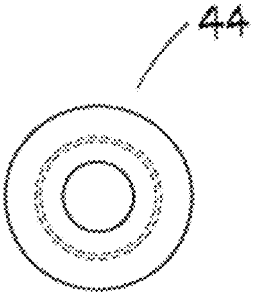
FIG. 7 depicts a plan view of the outlet bearing shown in FIG. 6.

The outlet end cap 14 can include an outlet tube end 34, an outlet inner perimeter 36, an opposing bearing end 38 and an outlet tube 40. The outlet inner perimeter 36 can be sized to receive an outer perimeter of the auger tube 12. In some embodiments, the opposing bearing end 38 can define a bearing bore that can be configured to receive an outlet bearing 44 and a shaft seal 46, as shown in FIGS. 6 and 7. The outlet tube 40 can extend outward from an outer perimeter of the outlet end cap 14. An inner perimeter of the outlet tube 40 can be in fluid communication with the outlet inner perimeter 36 to facilitate the flow of a fluid therethrough. It can be preferable that an axis 50 of the outlet tube 40 have an acute angle "A" with the opposing bearing end 38, such that it can be oriented slightly downward to have an angle of between 5-10 degrees, but other angle relationships could also be used. A barbed end 52 can be formed at an end of the outlet tube 40 to retain an outlet hose. The outlet end cap 14 can be fabricated or at least partially formed from a single piece of material.

The fluid auger 16 can include an auger shaft 54 and a helical flute screw 56. In some embodiments, the helical flute screw 56 can be molded over the auger shaft 54. In other embodiments, the fluid auger 16 could also be molded as a single piece of material with shaft extensions extending from each end of the helical flute screw 56. In some embodiments, a metal sleeve, not shown, could be pressed over the plastic shaft extensions to resist wear. Alternatively, shaft extensions made of a metal rod could be pressed into each end of the helical flute screw 56. The following dimension can be given by way of example and not by way of limitation. A pitch "P" value of about three inches, between adjacent flutes 58, has been found to provide the best pumping action, but other values may also be used. An inlet end of the auger shaft 54 can be sized to be rotatably received by the blind inlet bearing 32.

An optional cross section 60 may be formed on an outlet end of the auger shaft 54 to be received by or coupled to a powered rotary device, for example, a hand-held drill. A shaft hole or aperture can be formed through the opposing bearing end 38 to provide clearance for the outlet end of the auger shaft 54. One end of the auger tube 12 can be inserted into the inlet inner perimeter 20 of the inlet end cap and an opposing end of the auger tube 12 can be inserted into the outlet inner perimeter 36 of the outlet end cap 14. The ends of the auger tube 12 can be retained in the inlet end cap 10 and the outlet end cap 14 with a bonding, sonic welding, fasteners, or any other suitable retention device or method. In use, the inlet end cap 10 can be inserted into a fluid and the outlet hose can be positioned to dispense the fluid. A chuck of a drill can be secured to the outlet end of the auger shaft 54 to rotate the auger shaft 54 to propel fluid through the fluid pump 1.

With reference to FIG. 2*a*, the fluid pump 2 can include an inlet end cap 82, an auger tube 84, an outlet end cap 86, and a fluid auger 88. The inlet end cap 82 can include an inlet tube end 90, an inlet inner perimeter 83, a bearing retention member 85 (not visible on FIG. 2*a*, but similar to the bearing retention member 22) and an opposing inlet end 92. The inlet inner perimeter 83 can be sized to receive an outer perimeter 87 of the auger tube 84. The inlet tube end 90 can include a plurality of openings for pulling water into the inlet inner perimeter, not shown but similar to the cavities 26 shown in FIG. 3. The bearing retention member 85 can retain the blind inlet bearing 32 within the inlet tube end 90. The outlet end cap 86 can include an outlet tube end 93, an outlet inner perimeter 91, an opposing bearing end 94 and an outlet tube 96. The outlet inner perimeter 91 can be sized to receive an outer perimeter 89 of the auger tube 84. The outlet bearing 44 and the shaft seal 46 can be retained in the outlet cap end 94. The outlet tube 96 can extend outward from an outer perimeter of the outlet end cap 86. An inner perimeter of the outlet tube 96 communicates with the outlet inner perimeter 91 to facilitate the flow of fluid therethrough. The fluid auger 88 can include an auger shaft 98 and a tapered helical flute screw 100. A diameter of the tapered helical flute screw at a bottom can be greater than a diameter at a top thereof.

With reference to FIG. 1*a*, a motor-powered fluid pump 3 can include the inlet cap 10, the auger tube 12, the outlet end cap 14, the fluid auger 16, an electric motor 102 and a rechargeable and detachable battery 104. The electric motor 102 can be attached to the opposing bearing end 38 of the outlet end cap 14. A drive shaft (not shown) of the electric motor 102 can be coupled with the auger shaft 54 to turn the fluid auger 16. The drive shaft could be a hollow drive shaft. The battery 104 can be removably attached to the electric motor 102 with any suitable attachment device or method. The electric motor 102 can be rotated by any suitable power switch 106 connected between the electric motor 102 and the battery 104. The electric motor 102 may include internal gear reduction for increasing a speed of the drive shaft 54, or the gear reduction may be external to the electric motor 102.

Figure 10:
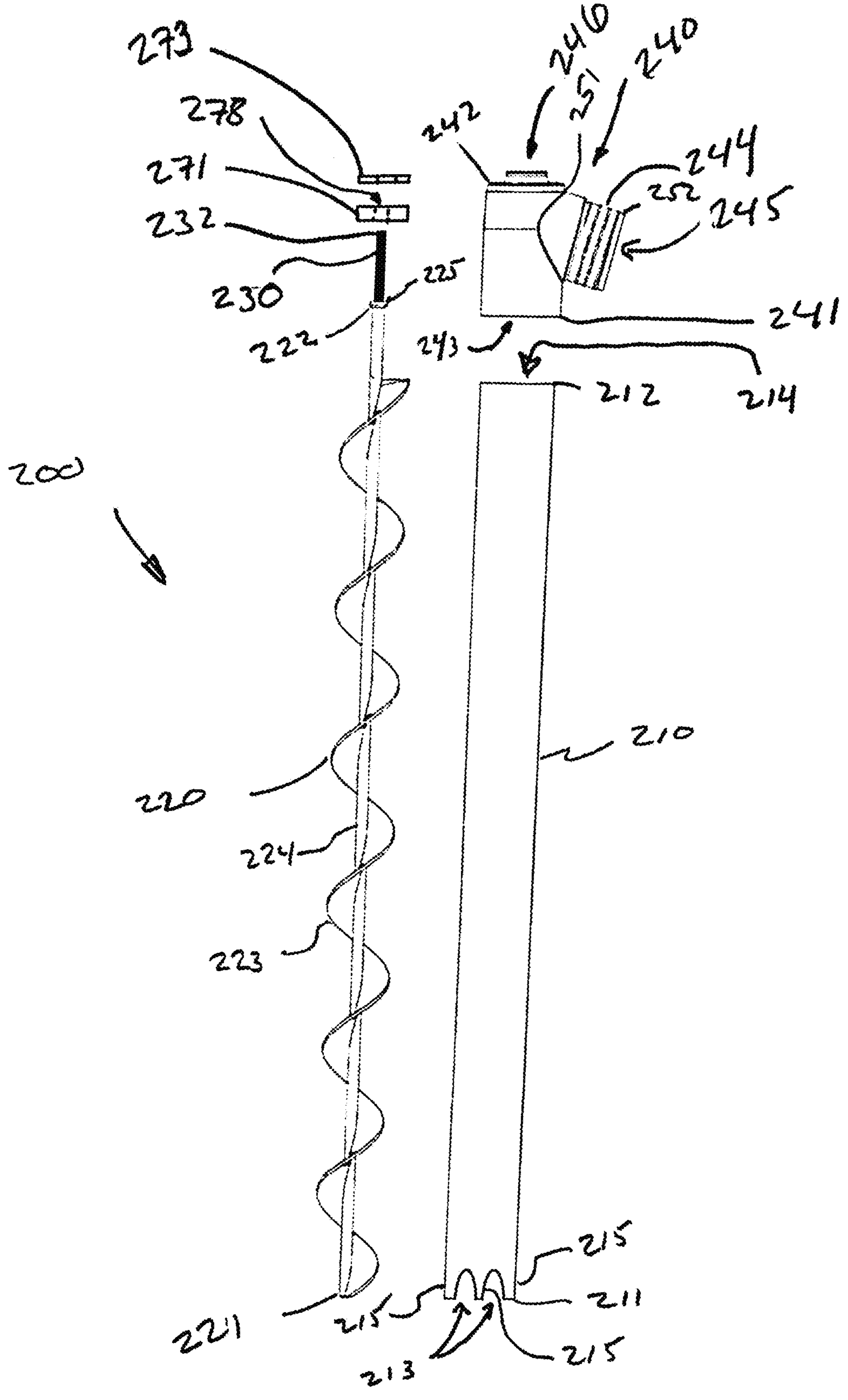
FIG. 10 depicts a side elevation view of an illustrative fluid pump configured to be powered by a rotary tool in a disassembled configuration that can include an auger tube, a helical screw, and an outlet end cap according to one or more embodiments described.

Referring to FIG. 10, The inlet end cap 10 can include an inlet tube end 18, an inlet inner perimeter 20, the bearing retention member 22, and an opposing inlet end 24. The inlet inner perimeter 20 can be sized to receive an outer perimeter of the auger tube 12. The inlet tube end 18 can include a plurality of cavities 26 formed in a surface thereof for pulling water into the inlet inner perimeter 20. The bearing retention member 22 can include a bearing retention portion 28 and a plurality of mounting spokes 30. The plurality of mounting spokes 30 can extend outward from an outer perimeter of the bearing retention portion 28 and can be engaged with the inlet inner perimeter 20. The inlet end cap 10 can be fabricated from a single piece of material. A bearing bore can be formed in the bearing retention portion 28 to retain or otherwise receive the blind inlet bearing 32.

Figure 8:
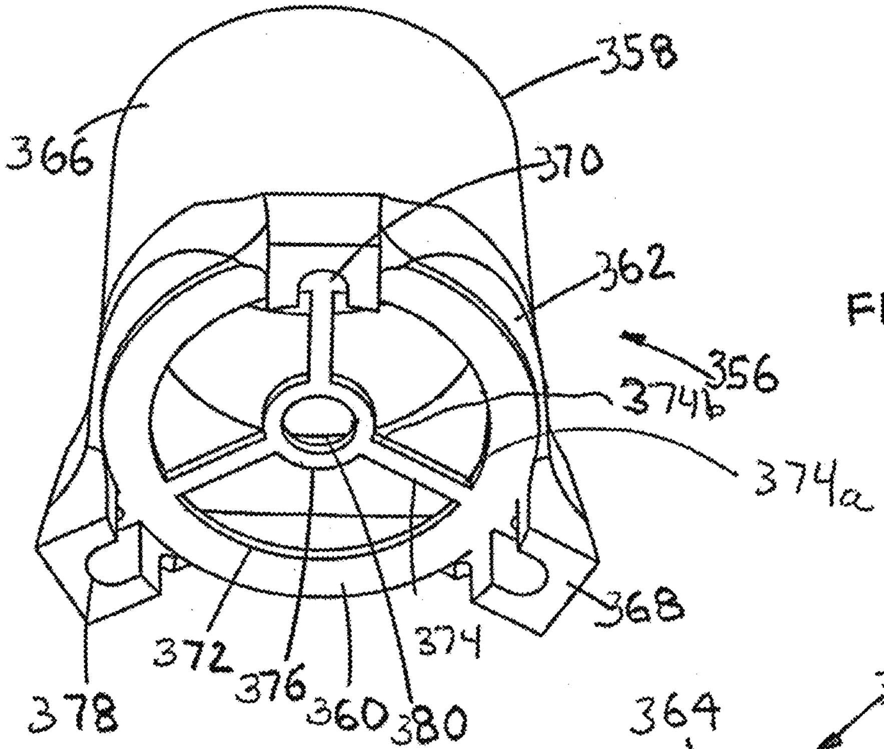
FIG. 8 depicts a perspective view of an inlet end cap of an illustrative fluid pump having a retention plate according to one or more embodiments described.
Figure 9:
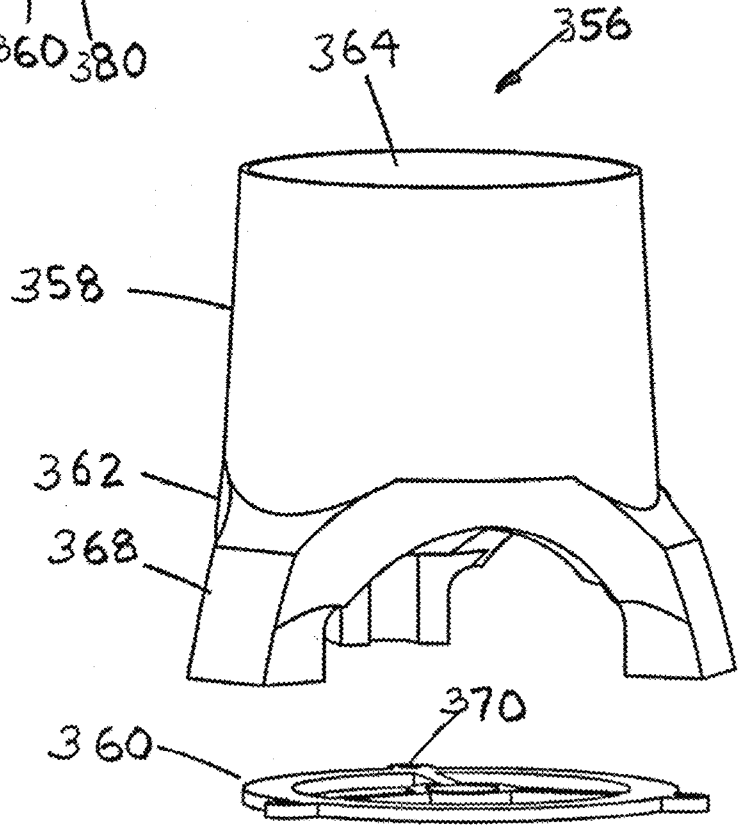
FIG. 9 depicts a perspective view of the inlet end cap shown in FIG. 8 in a disassembled configuration.

With reference to FIGS. 8 and 9, a plate inlet end cap 355 can include an end cap body 358 and a retention plate 360. The end cap body 358 can include an inlet tube end 362, an inlet inner perimeter 364, an opposing inlet end 366 and a plurality of feet 368. The plurality of feet 368 extend outward from the inlet tube end 362 and can provide clearance for the ingress of fluid into the auger tube 12. The inlet inner perimeter 364 can be sized to receive an outer perimeter of the auger tube 12 or the auger tube 84. An end of the auger tube 12 can be retained in the inlet inner perimeter 364 of the end cap body 358 with bonding, sonic welding, fasteners, or any other suitable retention device or method. The retention plate 360 preferably can include a plurality of retention projections 370, an inner perimeter 372, a plurality of bearing spokes 374 and a bearing retainer 376. In some embodiments, a projection bore 378 can be formed in a bottom of each foot 368 to receive one of the retention projections 370. The retention plate 360 can be attached to the end cap body 358 with a plurality of fasteners (not shown) or any other suitable detachable retention device. In some embodiments, a first end **374*a* of the plurality of bearing spokes 374 can extend inward from the inner perimeter 372. In some embodiments, a second end 374*b* of the plurality of spokes 374 can extend from an outer perimeter of the bearing retainer 376. A bearing hole 380 can be formed through the bearing retainer 376 to receive the blind inlet bearing 32. Removal of the retention plate 360 can allow the fluid auger 16, 88 to be removed from the auger tube 12, 84 to clear potential clogs within the auger tube 12, 84**.

Figure 11:
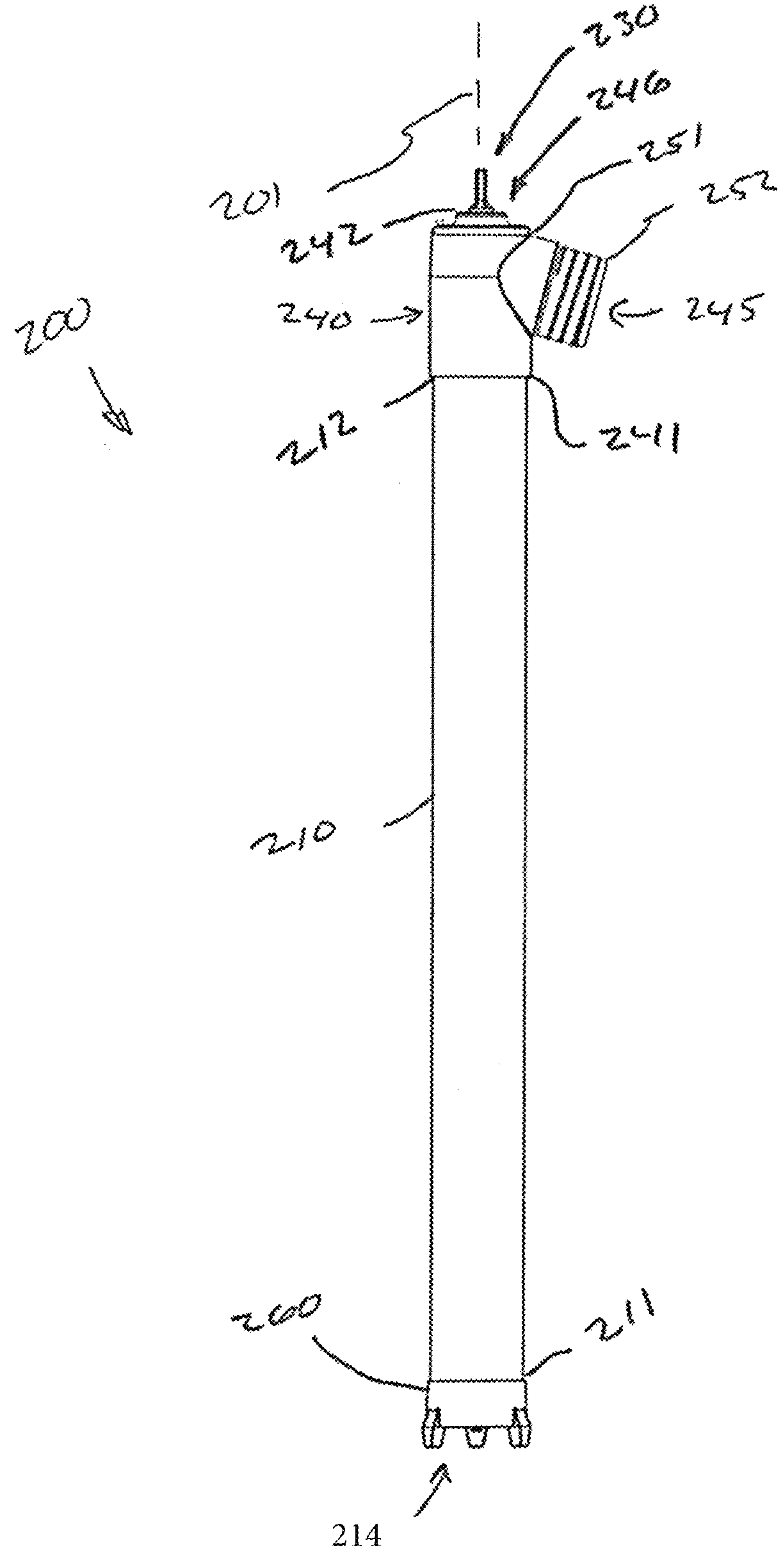
FIG. 11 depicts a side elevation view of the fluid pump shown in FIG. 10 in an assembled configuration that can include an optional inlet end cap.
Figure 12:
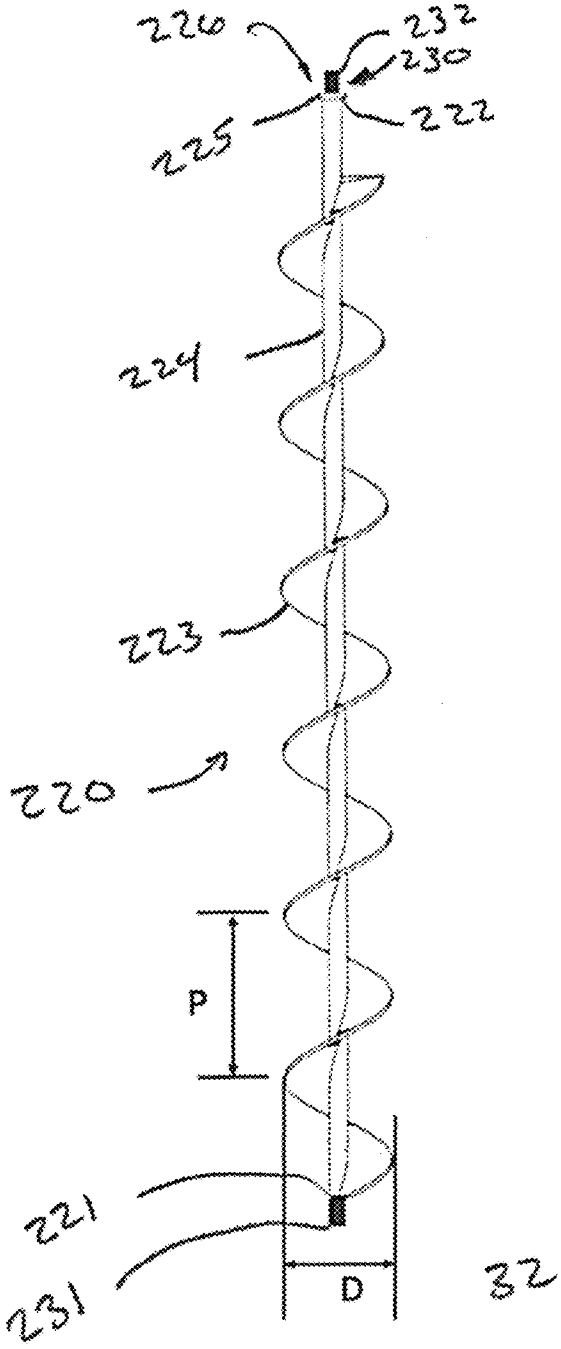
FIG. 12 depicts an elevation view of the helical screw of the pump shown in FIG. 10 that includes a drive shaft disposed within a longitudinal through bore defined by the helical screw.
Figure 13:
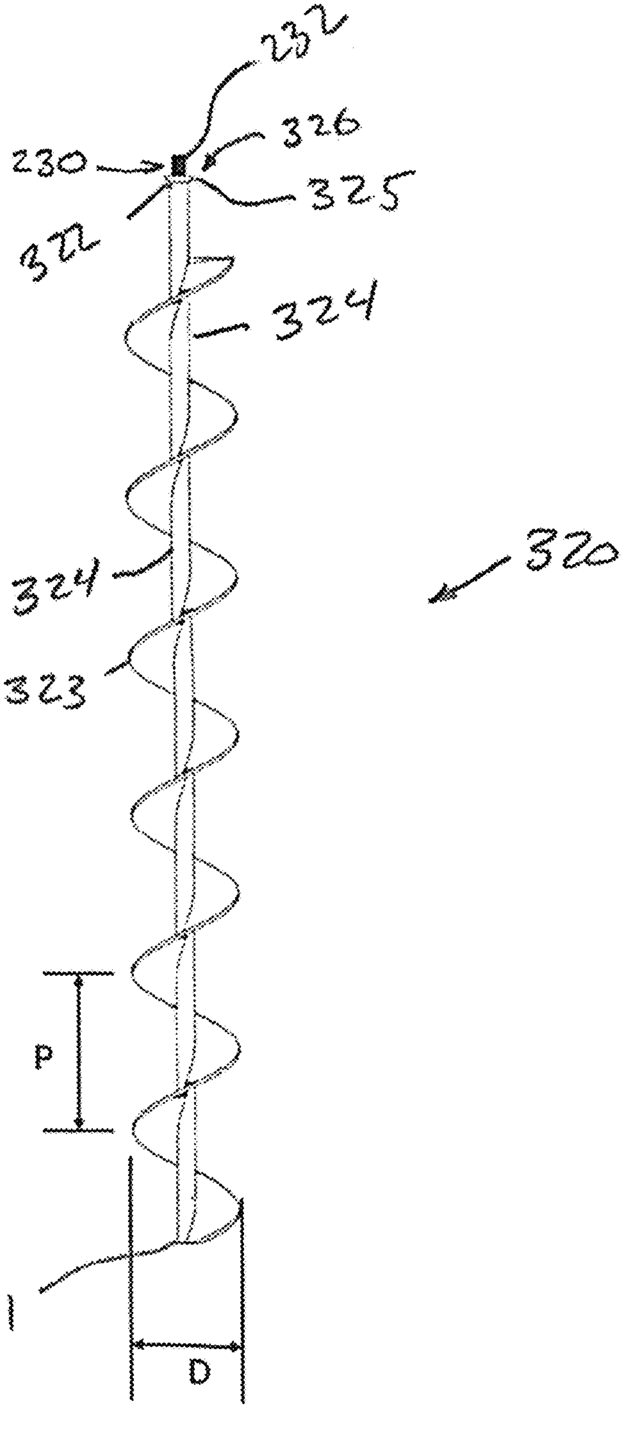
FIG. 13 depicts an elevation view of another helical screw that includes a drive shaft coupled to a second end of the helical screw according to one or more embodiments described.

FIG. 10 depicts a front elevation view of an illustrative fluid pump 200 that can be configured to be powered by a rotary tool in a disassembled configuration that can include an auger tube 210, a helical screw 220, a drive shaft 230, and an outlet end cap 240. FIG. 11 depicts an elevation view of the fluid pump 200 shown in FIG. 10 in an assembled configuration that can include an optional inlet end cap 260. FIG. 12 depicts an elevation view of the helical screw 220 of the fluid pump 200 and a drive shaft 230 that can be disposed through a longitudinal through bore 226 defined by the helical screw 220. FIG. 13 depicts an elevation view of another helical screw 320 and the drive shaft 230 that can be coupled to a second end 322 of the helical screw 320.

Referring to FIGS. 10 to 12 collectively, in some embodiments, the auger tube 210 can include a first end 211 and a second end 212. In some embodiments, the auger tube 210 can be similar to or can be the auger tube 12 shown in FIGS. 1, 2, and **3*a*. The auger tube 210 can define a bore 214 that can extend from the first end 211 to the second end 212. In some embodiments, the bore 214 can be a longitudinal bore 214. In some embodiments, the auger tube 210 can be a cylindrical auger tube 210 that can have a constant diameter along a length of the auger tube 210. In other embodiments, the auger tube 210 can be similar or can be the auger tube 84 shown in FIG. 2*a* and can have a non-constant diameter along the length of the auger tube. Said another way, the auger tube 210 can be configured as a frusto-conical auger tube 210**.

Figure 16:
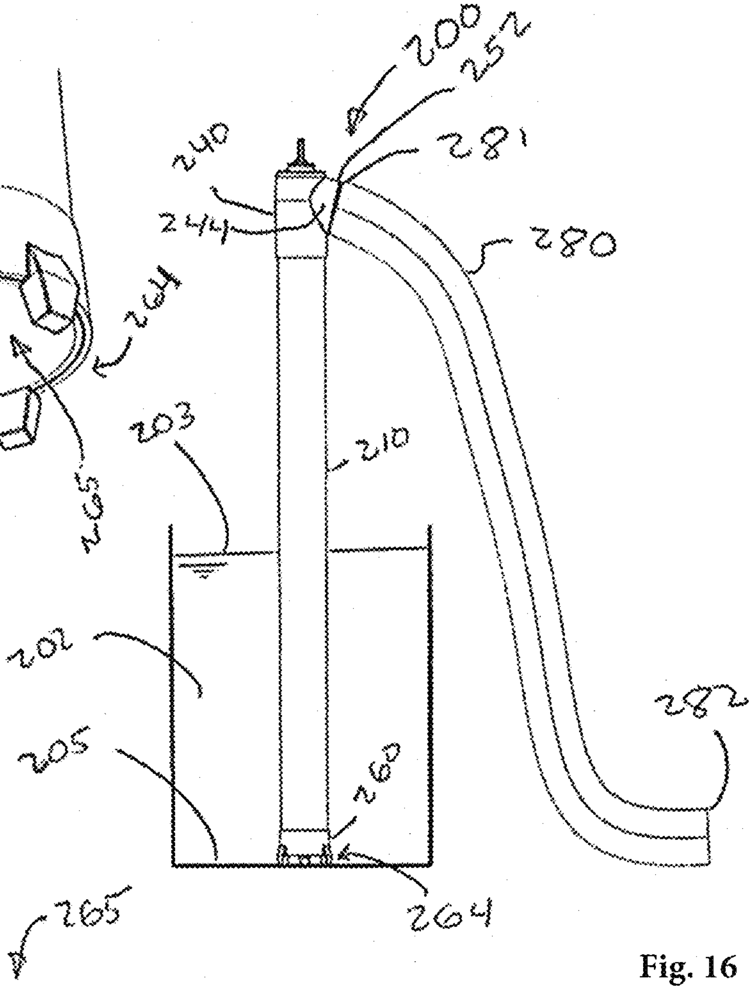
FIG. 16 depicts an elevation view of the fluid pump depicted in FIG. 11 with a first end of the auger tube and the inlet end cap positioned within a fluid that includes an optional discharge hose.

In some embodiments, the first end 211 of the auger tube 210 can define a plurality of stand-off feet 215 that can define a plurality of fluid passages 213. In some embodiments, the plurality of stand-off feet 215 can be sized and arranged to permit a fluid to flow into the bore 214 defined by the auger tube 210 when the plurality of stand-off feet 215 abuts against a submerged surface 205 that can be a submerged surface 205 at a bottom of a body of a fluid 202, as shown in FIG. 16 and is described in more detail below. In some embodiments, the auger tube 210 can be at least partially formed from a synthetic polymer, or a polyvinyl chloride (PVC) tube, or an aluminum tube, or a steel tube, or any other suitable material. In some embodiments, the auger tube 210 can be at least partially formed from a "first" synthetic polymer. In some embodiments, the auger tube 210 can be formed by an extrusion process, for example, a polymer extrusion process.

In some embodiments, the fluid pump 200 can include the helical screw 220 as shown in FIGS. 10 and 12. In some embodiments, the helical screw 220 can be similar to or the same as the fluid auger 16 or the fluid auger 88 shown in FIGS. 2 and **3*a*, respectively. In some embodiments, the helical screw 220 can omit or exclude the auger shaft 54, and the auger shaft 98 shown on FIGS. 2 and 3*a* respectively. In some embodiments, the helical screw 220 can include a first end 221, a second end 222, a helical auger 223, a central member 224 about which the helical auger 223 can be wound, and a collar 225 that can be disposed towards the second end 222 of the helical screw 220. In some embodiments, the helical screw 220 can define a longitudinal bore 226 therethrough that can extend from the first end 221 to the second end 222, as indicated in FIG. 12, and in such embodiments, the central member 224 can be configured as a tubular member. Said another way, the central member 224 can define a longitudinal bore 226 therethrough. In some embodiments, the helical auger 223, can have a pitch that can be defined as the ratio between a longitudinal length "P" of one complete revolution of the helical auger 223 and a diameter "D" of the helical auger 223 as shown. In some embodiments, the pitch can be between about 1, or about 2, or about 3 to about 4, or about 5, or about 6, or about 7, or about 8. In some embodiments, the helical screw 220 can be at least partially formed from a synthetic polymer or a "second" synthetic polymer. In some embodiments, the helical screw 220 can be formed by a first polymer injection molding process. In some embodiments, the helical screw 220 can be from a first thermoplastic polymer injection molding process or a first thermoset polymer injection molding process. In some embodiments, the helical screw 220 can include a plurality of helical augers 223** or a double helical auger, not shown.

In some embodiments, the fluid pump 200 can include the drive shaft 230. In some other embodiments, the drive shaft 230 can be secured, coupled, or otherwise connected to the helical screw 220. In some embodiments, the drive shaft 230 can include a first end 231 and a second end 232. In some embodiments, the drive shaft 230 can be a threaded metallic rod. In some embodiments, the drive shaft 230 can be at least partially formed from a steel rod, an aluminum alloy, a brass alloy, a bronze alloy, or any other metallic material. In some embodiments, the drive shaft 230 can have a length that can be greater than a length of the helical screw 220. In some embodiments, the drive shaft 230 can be disposed or secured within the longitudinal bore 226 defined by the helical screw 220. In some embodiments, the drive shaft 230 can be threadedly coupled to the helical screw 220 within the longitudinal bore 226 of the helical screw 220. In some other embodiments, the helical screw 220 can be formed, for example, molded around a portion of the drive shaft 230 such that the drive shaft 230 and the helical screw 220 are bonded to one another.

In some embodiments, the outlet end cap 240 can include a first end 241, a second end 242, and an outlet tube 244. In some embodiments, the outlet end cap 240 can be identical to or similar to the outlet end cap 14 shown in FIG. 1 and FIG. 1*a*, the outlet end cap 14 shown in FIG. 2, the outlet end cap 94 shown in FIG. 2*a*, and/or the outlet end cap 38 shown in FIG. 3. In some embodiments, the first end 241 of the outlet end cap 240 can define a bore 243 partially therethrough. Said another way, the outlet end cap 240 can be a substantially hollow member that can define an interior volume 247. In some embodiments, the outlet tube 244 can include a first end 251 and a second end 252. In some embodiments, the outlet tube 244 can define a bore 245 therethrough that can be in fluid communication with the bore 243 defined by the first end 241 of the outlet end cap 240. Said another way, the outlet tube 244 can be a tubular member, and the bore 245 defined by the outlet tube 244 can intersect with the interior volume 247 defined by the outlet end cap 240. In some embodiments, the outlet tube 244 can be an integral part of the outlet end cap 240 and in other embodiments, the outlet tube 244 can be a separate element that can be coupled, or joined, or bonded to the outlet end cap 240. In some embodiments, the second end 242 of the outlet end cap 240 can define an aperture 246 therethrough. In some embodiments, a diameter of the aperture 246 can be less than an inner diameter of the first end 241 of the outlet end cap 240. In some embodiments, the aperture 246 can be aligned with a longitudinal axis 201 of the fluid pump 200. In some embodiments, the aperture 246 can be aligned and intersect with the bore 243 defined by the first end 241 of the outlet end cap 240, or can intersect with the interior volume 247 defined by the outlet end cap 240.

In some embodiments, the fluid pump 200 can include a bearing 271. In some embodiments, the fluid pump 200 can include the bearing 271 and a seal 273. In some embodiments, the bearing can be the bearing 44 shown in FIG. 2, FIG. 3, FIG. 6, and FIG. 7 and the seal can be the seal 46 shown in FIG. 2. In some embodiments, the bearing 271 can define a bearing bore 274 therethrough and the bearing 271 can be configured to rotatively couple the drive shaft 230 to the outlet end cap 240. In some embodiments, the bearing 271 can be disposed within the aperture 246 defined by second end 242 of the outlet end cap 240. In some embodiments, the bearing 271 can be configured to longitudinally restrain or restrict a longitudinal movement of the drive shaft 230 and helical screw 220 relative to the outlet end cap 240 and the auger tube 210. In some embodiments, the bearing 271 can be configured as a bushing, or a roller bearing or a two-row roller bearing that can be configured to resist or support a longitudinal load a radial load. In some embodiments, the bearing 271 can be configured as a sealed bearing. In some embodiments, the seal 273 can be a rubber washer seal, a leather washer seal, or a felt washer seal, or an o-ring, and the seal 273 can be configured to restrict or prevent a flow of a fluid through the aperture 246 defined by the outlet end cap 240.

In some embodiments, the outlet end cap 240 can be at least partially formed from a synthetic polymer, or a "third" synthetic polymer. In some embodiments, the outlet end cap 240 can be formed by a second polymer injection molding process. In some embodiments, the outlet end cap 240 can be by a second thermoplastic polymer injection molding process or a second thermoset polymer injection molding process. In some embodiments, the outlet end cap 240 can be monolithic. In some other embodiments, the outlet end cap 240 can comprise a plurality of subcomponents that can be bonded to one another with a bonding material, for example welded, glued, fused, or otherwise bonded to one another to form the outlet end cap 240. For example, the outlet end cap 240 can be at least partially formed from two half outlet end caps that can be bonded to one another with an epoly or a glue, or outlet tube 244 can be a subcomponent of the outlet end cap 240 and the outlet tube 244 and the outlet end cap 240 can be joined, welded, bonded, glued, fused, or otherwise connected to one another to form the outlet end cap 240.

Referring to FIG. 13, in other embodiments, the fluid pump 200 can include the helical screw 320 in lieu of the helical screw 220. In some embodiments, the helical screw 320 can include a first end 321, a second end 322, a helical auger 323, a central member 324 about which the helical auger 323 can be wound, and a collar 325 that can be disposed towards the second end 322 of the helical screw 320. In some embodiments, the second end 322 of the helical screw 320 can define a longitudinal bore 326 partially therethrough. In some embodiments, the helical auger 323 can have a pitch that can be defined as the ratio between a longitudinal length "P" of one complete revolution of the helical auger 323 and a diameter "D" of the helical auger 323 as shown. In some embodiments, the pitch can be between about 1, or about 2, or about 3 to about 4, or about 5, or about 6 or about 7, or about 8. In some embodiments, the helical screw 320 can be at least partially formed from a synthetic polymer, or a second synthetic polymer. In some embodiments, the helical screw 320 can be formed by the first polymer injection molding process. In some embodiments, the helical screw 320 can be by the first thermoplastic polymer injection molding process or the first thermoset polymer injection molding process. In some embodiments, the helical screw 320 can include a plurality of helical augers or a double helical auger, not shown.

In some embodiments, the fluid pump 200 can include the helical screw 320 and the drive shaft 230. In such embodiments, the drive shaft 230 can have a length that can be less than a length of the helical screw 320 and the first end 231 of the drive shaft 230 can be secured to the second end 322 of the helical screw 320. In some embodiments, the first end 231 of the drive shaft 230 can be threadedly coupled to the second end 322 of the helical screw 320, for example, the first end 231 of the drive shaft 230 can be threaded into the longitudinal bore 326 defined by the second end 322 of the helical screw 320. In other embodiments, the helical screw 320 can be formed, for example, molded around a portion of the drive shaft 230 such that the drive shaft 230 and the helical screw 320 are bonded to one another.

Figure 14:
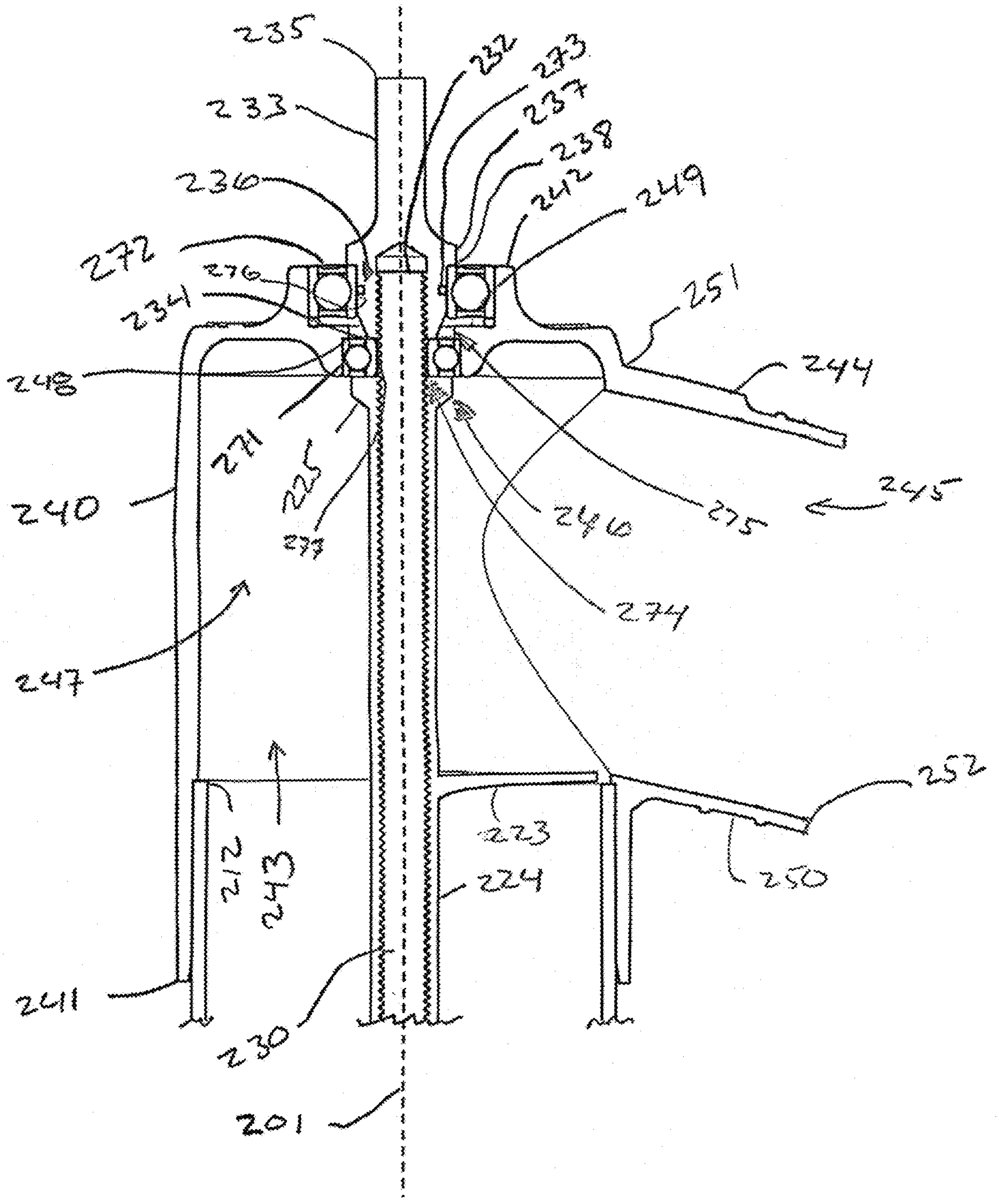
FIG. 14 depicts a cross-sectional elevation view of an illustrative outlet end cap of an illustrative fluid pump that includes a first bearing, a second bearing, an annular seal, and an adapter according to one or more embodiments described.

FIG. 14 depicts a detailed cross-sectional elevation view of the outlet end cap 240. In some embodiments, the bearing 271 can be a "first bearing" 271, and in such embodiments, the fluid pump 200 can further include a second bearing 272. In some embodiments, the fluid pump 200 can include an adapter 233. In some embodiments, the second end 232 of the drive shaft 230 can extend at least partially through the aperture 246 defined by the second end 242 of the outlet end cap 240. In some embodiments, the adapter 233 can include a first end 234 and a second end 235. In some embodiments, the first end 234 of the adapter 233 can be coupled to the second end 232 of the drive shaft 230. In some embodiments, as shown the second end 232 of the drive shaft 230 can be threadedly coupled to the first end 234 of the adapter 233. In some embodiments, the second end 235 of the adapter 233 can be configured to interface with a powered rotary tool, for example, a drill or an electric motor. In some embodiments, the adapter 233 can be at least partially formed from a metallic material, for example, a steel alloy, or an aluminum alloy, or a polymer.

In some embodiments, the first bearing 271 and the second bearing 272 can be configured as radial support bearings. In some embodiments, the fluid pump 200 can include the first bearing 271 and can be free of the second bearing 272, and in other embodiments, the fluid pump 200 can include both the first bearing 271, and the second bearing 272. In some embodiments, the first bearing 271 and/or the second bearing 272 can be configured as combination radial and thrust bearing(s) that can be configured to resist a radial force and a longitudinal force relative to the longitudinal axis 201 as the drive shaft 230 and the adapter 233 rotate within the aperture 246 defined by the outlet end cap 240. In some embodiments, the first bearing 271 and the second bearing 272 can each be disposed within the aperture 246 defined by the outlet end cap 240, and each can rotatively couple the drive shaft 230 and/or the adapter 233 to the outlet end cap 240. Said another way, the first bearing 271 and the second bearing 272 can each be disposed or located within the aperture 246 defined by the second end 242 of the outlet end cap 240 and the drive shaft 230 and/or the adapter 233, and can be disposed within a first bearing bore 274 defined by the first bearing 271 and/or a second bearing bore 275 defined by the second bearing 272 to permit the drive shaft 230 and the adapter 233 to rotate relative to the outlet end cap 240. In some embodiments, the first bearing 271 can be longitudinally disposed between the collar 225 of the helical screw 220 and the first end 234 of the adapter 233 when the first end 234 of the adapter 233 and the second end 232 of the drive shaft 230 are coupled to one another. In some embodiments, the first bearing 271 can be longitudinally disposed between the collar 225 of the helical screw 220 or the helical screw 320 and a first shoulder 248 defined by the outlet end cap 240. In some embodiments, the first bearing 271 can be configured to longitudinally restrain or restrict a longitudinal movement of the drive shaft 230 and helical screw 220 relative to the outlet end cap 240 and the auger tube 210 in a direction from the first end 211 toward the second end 212 of the auger tube 210.

In some embodiments, the second bearing 272 can be disposed within the aperture 246 defined by the second end 242 of the outlet end cap 240 and radially between the adapter 233 and the second end 242 of the outlet end cap 240. In some embodiments, the second bearing 272 can be longitudinally disposed between a second shoulder 249 defined by the second end 242 of the outlet end cap 240 and a shoulder 238 defined by the adapter 233. In some embodiments, the second bearing 272 can be configured to longitudinally restrain or restrict a longitudinal movement of the drive shaft 230 and the helical screw 220 relative to the outlet end cap 240 and the auger tube 210 in a direction from the second end 212 towards the first end 211 of the auger tube 210. In some embodiments, the second bearing 272 can be configured to resist a thrust force that is generated when the helical screw 220 rotates within the auger tube 210 while the first end 211 is submerged in a fluid. In some embodiments, the thrust force can result from a static head of the fluid being lifted above a surface of the fluid and/or an inertial load resulting from an acceleration or a momentum of the fluid as the fluid moves towards the outlet end cap 240. In some embodiments, the thrust force can be a downward thrust force when the fluid pump 200 is oriented vertically.

In some embodiments, the adapter 233 can define at least one seal groove 236 on an outer surface 237 thereof towards the first end 234 of the adapter 233. In some embodiments, the seal groove 236 can be a circumferential groove that can have a rectangular cross-section. In some embodiments, the seal 273 can be configured as an o-ring that can be disposed partially within the seal groove 236. In some embodiments, the seal can be disposed between the outer surface 237 of the adapter 233 and an inner surface 276 of the second bearing 272 or an inner surface 277 of the first bearing 271 to restrict or prevent a flow of a fluid from the bore 243 defined by the first end 241 of the outlet end cap 240 or the interior volume 247 past the first bearing 271 and the second bearing 272 and/or through the aperture 246 defined by the second end 242 of the outlet end cap 240. Said another way, the seal 273 can be configured to prevent or resist a portion of the fluid from leaking through the aperture 246 when the drive shaft 230, and the helical screw 220 or the helical screw 320 are rotating relative to the outlet end cap 240 and the auger tube 210 and when the auger tube 210 is positioned within a body of a fluid 202. It should be understood that the seal 273 can be configured as a rubber washer seal, a leather washer seal, or a felt washer seal, or an o-ring as described above.

In some embodiments, the first end 241 of the outlet end cap 240 and the second end 212 of the auger tube 210 can be coupled to one another. In some embodiments, as shown, the second end 212 of the auger tube 210 can be inserted into the bore 243 defined by the first end 241 of the outlet end cap 240 and can be glued, fused, bonded, or otherwise connected to the first end 241 of the outlet end cap 240. In other embodiments, not shown, the second end 212 of the auger tube 210 and the first end 241 of the outlet end cap 240 can be flanged, threaded, screwed, or welded to one another. In still other embodiments, not shown, the first end 241 of the outlet end cap 240 can be inserted into the second end 212 of the auger tube 210 and can be glued, fused, bonded, or otherwise connected to the second end 212 of the outlet end cap auger tube 210.

Figure 15:
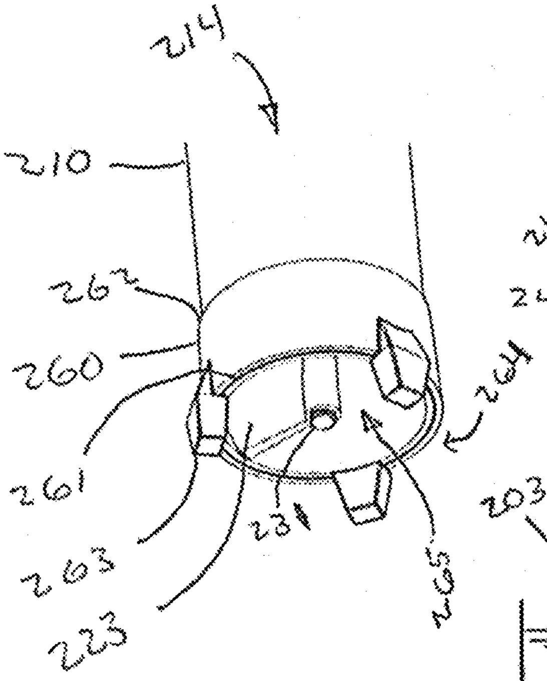
FIG. 15 depicts a perspective view of the inlet end cap of the fluid pump shown in FIG. 11.

FIG. 15 depicts a perspective view of the inlet end cap 260 of the fluid pump 200 shown in FIG. 12. In some embodiments, the optional inlet end cap 260 can be similar or identical to the inlet cap 10 shown in FIG. 1, FIG. 1*a*, and FIG. 2, and the inlet cap 82 shown in FIG. 2*a*. In some embodiments, the optional inlet end cap 260 can include a first end 261 and a second end 262 and can define a longitudinal bore 265 therethrough. In some embodiments, the optional inlet end cap 260 can include a plurality of stand-off feet 263 that can extend away from the first end 261 of the optional inlet end cap 260 in a direction that is away from the second end 262 of the optional inlet end cap 260. In some embodiments, the plurality of stand-off feet 263 can define a plurality of fluid passages 264 that permits a fluid to flow into the bore 214 of the auger tube 210 when the plurality of stand-off feet 263 abuts against a submerged surface, as shown in FIG. 16 below. In some embodiments, the optional inlet end cap 260 can be disposed on or connected to the auger tube 210 at a second end 262 thereof. In some embodiments that include the optional inlet end cap 260, the auger tube 210 can be free of the optional plurality of stand-off feet 215.

In some embodiments, the optional inlet end cap 260 can be at least partially formed from a synthetic polymer, or a "fourth" synthetic polymer. In some embodiments, the inlet end cap 260 can be formed by a third polymer injection molding process. In some embodiments, the optional inlet end cap 260 can be at least partially formed from a third thermoplastic polymer injection molding process or a third thermoset polymer injection molding process. In some embodiments, the inlet end cap 260 can be monolithic. In some other embodiments, the inlet end cap 260 can comprise a plurality of subcomponents that can be joined, bonded, welded, glued, fused, or otherwise connected to one another to form the inlet end cap 260. For example, the optional inlet end cap 260 can be at least partially formed from two half inlet end caps that can be bonded to one another. It should be understood that the first synthetic polymer, the second synthetic polymer, the third synthetic polymer and the fourth synthetic polymer can each be the same synthetic polymer material or can each be different synthetic materials or any combination thereof. As an example, the first synthetic polymer can be the same as the second synthetic polymer, and/or the same as the third synthetic polymer, and/or the fourth synthetic polymer, and/or the second synthetic polymer can be the same as the third synthetic polymer, and/or the fourth synthetic polymer.

FIG. 16 depicts an elevation view of the fluid pump 200 with the first end 211 of the auger tube 210 and the inlet end cap 260 positioned within a fluid 202 that can include an optional discharge hose 280. In some embodiments, the fluid 202 can be a liquid, for example, water, oil, fuel, or any other liquid, or a slurry, or a liquid that can include or contain debris, for example, leaves, twigs, mud, small stones or other debris. In some embodiments, the fluid 202 can be contained within a vessel 204, for example, a tank or a pool, or a pond, that can have a submerged surface 205 located at the bottom thereof. In some embodiments, the plurality of stand-off feet 215 can abut against the submerged surface 205 to provide or create the plurality of fluid passages 213 that can allow the fluid 202 to enter into the first end 261 of the optional inlet end cap 260 and thereafter into the bore 214 defined by the auger tube.

In some embodiments, the second end 252 of the outlet tube 244 can be configured to receive a first end 281 of an optional discharge hose 280. In some embodiments, the discharge hose 280 can be configured as a spiral wound hose 280. In some embodiments, an outer surface 250 of the outlet tube 244 can include a threaded surface. In some embodiments, the discharge hose 280 can have a first end 281 and a second end 282. In some embodiments, the first end 281 of the discharge hose 280 can be connected to the second end 252 of the outlet tube 244. In some embodiments, the discharge hose 280 can be a spiral wound hose and the outer surface 250 of the outlet tube 244 can include threads that can interface with the discharge hose 280 and the first end 281 of the discharge hose 280 can be coupled to the second end 252 of the outlet tube 244. In other embodiments, the first end 281 can be coupled to or secured to the second end 252 of the outlet tube 244 by a flange, or a hose clamp, a threaded connection, or any other hose connection device means.

In some embodiments, the fluid pump 200 can be in an assembled configuration as shown in FIG. 11 when the first end 241 of the outlet end cap 240 is connected to the second end 212 of the auger tube 210, the helical screw 220 or the helical screw 320 is disposed within the auger tube 210, the second end 232 of the drive shaft 230 extends through the bore defined by the first bearing 271 and optionally the second bearing 272. In some embodiments, when the fluid pump 200 is in an assembled configuration and the first end 281 of the discharge hose 280 is coupled to the second end 252 of the outlet tube 244, and the first end 211 of the auger tube 210, the outlet end cap 240 and the discharge hose 280 are filled with a portion of the fluid 202, and the second end 282 of the discharge hose 280 is located at an elevation that is below an elevation of a surface 203 of the fluid 202, the helical screw 220, or the helical screw 320 can be free to rotate relative to the auger tube 210 as the fluid 202 flows through fluid pump 200. Said another way, the drive shaft 230 and the helical screw 220 or the drive shaft 230 can be configured to freely rotate and the fluid pump 200 can function as a siphon when the auger tube 210, the outlet end cap 240, the outlet tube 244, and the discharge hose 280 are filled with a portion of the fluid 202.

Figure 17:
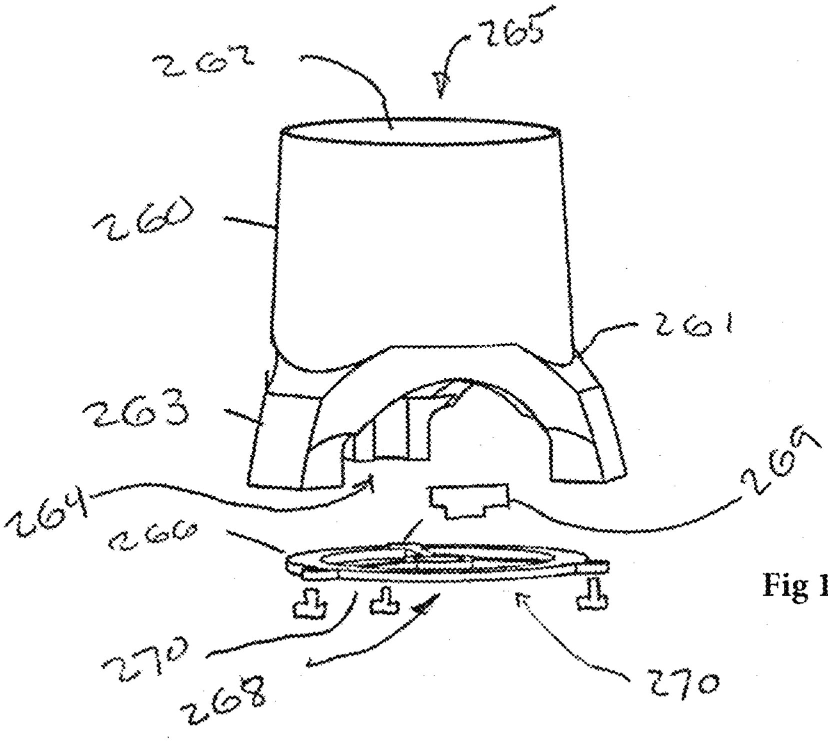
FIG. 17 depicts a perspective view of the inlet end cap shown in FIG. 11 that includes an optional retention plate and a thrust bearing in a disassembled state.

FIG. 17 depicts a perspective view of the inlet end cap 260 shown in FIG. 11 that can include an optional retention plate 266 and a thrust bearing 269 in a disassembled state. In some embodiments, the fluid pump 200 can include the optional inlet end cap 260 that can further include the optional retention plate 266. In such embodiments, the fluid pump 200 can include the first bearing 271 and can be free of the second bearing 272 and the retention plate 266 can be configured to support the first end 231 of the drive shaft 230 or the first end 321 of the helical screw 320. In some embodiments, the optional retention plate 266 can define a plurality of fluid paths therethrough 270 that can permit a fluid to flow through the optional retention plate 266. In some embodiments, the first end 231 of the drive shaft 230 or the first end 321 of the helical screw 320 can be configured to bear against the optional retention plate 266 when the drive shaft 230 or the helical screw 320. In some embodiments, the optional retention plate 266 can be configured to resist at least a portion of the thrust force in the direction from the second end 212 to toward the first end 211 of the auger tube 210. In some embodiments, the thrust force can be a downward thrust force when the fluid pump 200 is oriented vertically that can result from the fluid 202 being lifted towards the second end 212 of the auger tube 210 as the drive shaft 230 and helical screw 220 are rotated. In some embodiments, the thrust force can result from a static head of the fluid 202 being lifted above the surface 203 of the fluid 202 and an inertial load resulting from an acceleration or a momentum of the fluid 202 towards the outlet end cap 240.

In some embodiments, the optional retention plate 266 can define a bearing hole 268 at least partially therethrough and the first end 231 of the drive shaft 230 or the first end 321 of the helical screw 320 can at least be partially disposed within the bearing hole 268 defined by the retention plate 266 and can be configured to resist at least a portion of the thrust force in the direction from the second end 212 to toward the first end 211 of the auger tube 210. In some embodiments, the thrust force can be a downward thrust force when the fluid pump 200 is oriented vertically that can result from the fluid 202 being lifted towards the second end 212 of the 210 as the drive shaft 230 and helical screw 220 are rotated. In some embodiments, the thrust force can result from a static head of the fluid 202 being lifted above the surface 203 of the fluid 202 and an inertial load resulting from an acceleration or a momentum of the fluid 202 towards the outlet end cap 240. In some embodiments, a thrust bearing 269 can be disposed within the bearing hole 268 and between the optional retention plate 266 and the first end 231 of the drive shaft 230 or the first end 321 of the helical screw 320.

Figure 4:
FIG. 4 depicts a perspective view of an illustrative blind inlet bearing of an illustrative fluid pump according to one or more embodiments described.
Figure 5:
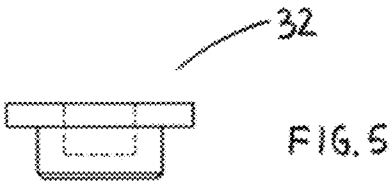
FIG. 5 depicts a side view of the blind inlet bearing shown in FIG. 4.

In some embodiments, the thrust bearing 269 can be similar to or can be the blind inlet bearing 32 depicted in FIGS. 4 and 5 and can be configured to allow a first body to rotate relative to a second body and support an axial or longitudinal load.

In some embodiments, the thrust bearing 269 can be configured a two-row roller bearing, a sealed two-row roller bearing, a bushing, or a wear pad.

In some embodiments, optional retention plate 266 can be secured or attached to the first end 261 of the optional inlet end cap 260 within the longitudinal bore 265 defined by the optional inlet end cap 260. In some embodiments, the optional retention plate 266 can be secured to the first end 261 of the optional inlet end cap 260 by a plurality of fasteners 267, three are shown. In some embodiments, the optional retention plate 266 can be similar to the retention plate 360 shown in FIGS. 8 and 9.

A process for manufacturing the 200 fluid pump is provided. In some embodiments, the process can include forming the auger tube 210 from a first polymer, forming the helical screw 220, or the helical screw 320 from a second polymer, and forming the outlet end cap 240 from a third polymer. In some embodiments, the process can include obtaining the drive shaft 230. In some embodiments, the process can include securing the drive shaft 230 to the helical screw 220 or securing the drive shaft 230 to the helical screw 320. In some embodiments, the process can include disposing the bearing 271 the aperture 246 defined by the second end 242 of the outlet end cap 240. In some embodiments, the process can include disposing the helical screw 220 or the helical screw 320 within the auger tube 210 such that the second end 232 of the drive shaft 230 extends at least partially through the bore 278 defined by the bearing 271. In some embodiments, the process can include coupling the first end 241 of the outlet end cap 240 to the second end 212 of the auger tube 210.

In some embodiments, the auger tube 210 can be formed by a polymer extrusion process. In some embodiments, the helical screw 220 or the helical screw 320 can be at least partially formed from by first polymer injection process. In some embodiments, the outlet end cap 240 can be at least partially formed from by a second polymer injection molding process. In some embodiments, the process can include coupling the inlet end cap 260 to the first end 211 of the auger tube 210. In some embodiments, the inlet end cap 260 can be at least partially formed from a third polymer. In some embodiments, the inlet end cap 260 can be formed by a third polymer injection molding process. In some embodiments, securing the drive shaft 230 to the helical screw 220 can include securing the first end 231 of the drive shaft 230 to the second end 222 of the helical screw 220. In some embodiments, the process can include securing the drive shaft 230 to the helical screw by molding the helical screw 320 about the drive shaft 230 by the injection molding process.

The present disclosure further relates to any one or more of the following embodiments:

A1. A fluid pump, that can include an auger tube having a first end and a second end; a helical screw having a first end and a second end; an outlet end cap having a first end that defines a longitudinal bore partially therethrough, a second end that defines an aperture therethrough, and an outlet tube that defines a bore therethrough in fluid communication with the longitudinal bore defined by the first end; a bearing that defines a bore therethrough; and a drive shaft having a first end and a second end, wherein: the drive shaft is secured to the helical screw; the helical screw is configured to be disposed within the auger tube, the second end of the drive shaft is configured to extend through the bore defined by the bearing, the bearing is disposed within the aperture defined by the second end of the outlet end cap; and the first end of the outlet end cap is configured to be coupled to the second end of the auger tube.

A2. The fluid pump of paragraph A1, wherein the outlet end cap is at least partially formed from a first polymer; the helical screw is at least partially formed from a second polymer; and the auger tube is at least partially formed from a third polymer.

A3. The fluid pump of paragraph A1 or A2, wherein the outlet end cap is monolithic.

A4. The fluid pump of any one of Paragraphs A1 to A3, wherein: the helical screw is formed by a first polymer injection molding process; the outlet end cap is formed by a second polymer injection molding process, and the auger tube is at least partially formed from a polymer extrusion process.

A5. The fluid pump of any one of Paragraphs A1 to A4, wherein the outlet end cap comprises a plurality of outlet end cap subcomponents that are joined to one another to form the outlet end cap.

A6. The fluid pump of any one of Paragraphs A1 to A5, wherein the outlet end cap comprises a plurality of outlet end cap subcomponents that are bonded to one another with a bonding material to form the outlet end cap.

A7. The fluid pump of any one of Paragraphs A1 to A6, wherein the first end of the auger tube comprises a plurality of stand-off feet that defines a plurality of fluid passages that permits a fluid to flow into a bore defined by the auger tube when the plurality of stand-off feet abuts against a submerged surface.

A8. The fluid pump of any one of Paragraphs A1 to A7, wherein: the drive shaft is at least partially formed from a metallic material, and the first end of the drive shaft is secured to the second end of the helical screw.

A9. The fluid pump of any one of Paragraphs A1 to A8, wherein: the bearing is a first bearing and the fluid pump further comprises a second bearing, and an adapter that defines a shoulder. The first bearing and the second bearing are each disposed within the aperture defined by the second end of the outlet end cap, the second end of the drive shaft is configured to extend through the bore defined by the first bearing and the bore defined by the second bearing, the second end of the outlet end cap defines a first shoulder and a second shoulder, a first end of the adapter is configured to be coupled to the second end of the drive shaft, the first bearing is disposed between a collar of the helical screw and the first shoulder defined by the second end of the outlet end cap, and the second bearing is disposed between the second shoulder defined by the second end of the outlet end cap and the shoulder defined by the adapter.

A10. The fluid pump of any one of Paragraphs A1 to A9, wherein at least one of the first bearing and the second bearing is configured react a longitudinal thrust of drive shaft that is generated when the first end of the auger tube is submerged in a fluid and the helical screw is rotated within the auger tube.

A11. The fluid pump of any one of Paragraphs A1 to A10, wherein: the fluid pump further comprises a seal configured to be at least partially disposed between an outer surface of the adapter and inner surface of the second bearing, and configured to restrict a fluid from flowing through the aperture defined by second end of the outlet end cap.

.A12. The fluid pump of any one of Paragraphs A1 to A11, further comprising an inlet end cap having a first end and a second end that define a longitudinal bore therethrough, wherein the inlet end cap is configured to be coupled to the first end of the auger tube.

A13. The fluid pump of Paragraphs A1 to A12, wherein the inlet end cap defines a plurality of stand-off feet that defines a plurality of fluid passages that permit a fluid to flow into the longitudinal bore defined by the inlet end cap when the plurality of stand-off feet abuts against a submerged surface.

A14. The fluid pump of Paragraphs A1 to A13, wherein the inlet end cap further comprises a retention plate disposed therewithin, and the retention plate is configured to support the first end of the drive shaft or the first end of the helical screw.

A15. The fluid pump of Paragraphs A1 to A14, wherein the drive shaft is at least partially formed from a metallic material, the helical screw defines a longitudinal bore therethrough, the drive shaft is disposed through the longitudinal bore defined by the helical screw, and the first end of the drive shaft can extend beyond the first end of the helical screw and is configured to abut against the retention plate.

A16. The fluid pump of Paragraphs A1 to A15, wherein the retention plate defines a bearing hole therethrough, the fluid pump further comprises a thrust bearing disposed within the bearing hole, and the thrust bearing is configured to at least partially support the first end of the drive shaft or the first end of the helical screw when the drive shaft and the helical screw rotate within the auger tube.

A17. The fluid pump of Paragraphs A1 to A16, further comprising a discharge hose coupleable to a second end of the outlet tube, wherein: when the outlet end cap is connected to the second end of the auger tube, the helical screw is disposed within the auger tube, the second end of the drive shaft extends through the bore defined by the support bearing and when a first end of the discharge hose is coupled to the second end of the outlet tube, the first end of the auger tube is submerged in a fluid, and the outlet end cap and the discharge tube are filled with a portion of the fluid, and a second end of the discharge hose is located at an elevation that is below an elevation of a surface of the fluid, the helical screw is free to rotate relative to the auger tube as the fluid moves through the auger tube, the outlet end cap, the outlet tube, and the discharge hose.

A18. The fluid pump of Paragraphs A1 to A17, further comprising a helical screw support member that is configured to be disposed within the longitudinal bore defined by the inlet end cap and to react at least a portion of a longitudinal force of the helical screw that is generated when the inlet end cap is submerged in a fluid and the helical screw is rotated within the auger tube.

A19. The fluid pump of Paragraphs A1 to A18, wherein the second end of the drive shaft is configured to be connected to a rotary tool.

A20. The fluid pump of Paragraphs A1 to A19, further comprising an electric motor coupled to the second end of the drive shaft.

A21. The fluid pump of Paragraphs A1 to A20, wherein the electric motor is a variable speed electric motor.

A22. The fluid pump Paragraphs A1 to A21, wherein the electric motor is a battery powered electric motor configured to receive a battery.

B1. A fluid pump that can include an auger tube having a first end and a second end; a helical screw having a first end and a second end; an outlet end cap having a first end that defines a longitudinal bore partially therethrough, a second end that defines an aperture therethrough and an outlet tube having a first end in fluid communication with the longitudinal bore defined by the first end of the outlet end cap; an inlet end cap that defines a longitudinal bore therethrough and having a first end, a second end, and a plurality of stand-off feet that defines a plurality of fluid passages that permit a fluid to flow into the longitudinal bore defined by the inlet end cap when the plurality of stand-off feet abuts against a submerged surface; a first bearing and a second bearing; a drive shaft having a first end and a second end; and an adapter that defines a shoulder, wherein: the first bearing and the second bearing are each disposed within the aperture defined by the second end of the outlet end cap, the second end of the drive shaft is configured to extend through the bore defined by the first bearing and the bore defined by the second bearing, the second end of the outlet end cap defines a first shoulder and a second shoulder, a first end of the adapter is configured to be coupled to the second end of the drive shaft and disposed within the bore defined by the second bearing, the first bearing is disposed between a collar of the helical screw and the first shoulder defined by the second end of the outlet end cap, the second bearing is disposed between the second shoulder defined by the second end of the outlet end cap and the shoulder defined by the adapter, the helical screw is formed by a first polymer injection molding process the outlet end cap is formed by a second polymer injection molding process, the inlet end cap is formed by a third polymer injection molding process, and the auger tube is at least partially formed from a polymer extrusion process.

C1. A process for manufacturing a fluid pump can include forming an auger tube from a first polymer; forming a helical screw from a second polymer; forming an outlet end cap from a third polymer; and obtaining a drive shaft having a first end and a second end, wherein the outlet end cap comprises a first end that defines a longitudinal bore partially therethrough, a second end that defines an aperture therethrough, and an outlet tube having a first end in fluid communication with the longitudinal bore defined by the first end of the outlet end cap; securing the drive shaft to the helical screw; disposing a bearing that defines a bore therethrough within the aperture defined by the second end of the outlet end cap; disposing the helical screw within the auger tube such that the second of the drive shaft extends through the bore defined by the bearing, and coupling the outlet end cap to a second end of the auger tube.

C2. The process of paragraph C1, wherein: the auger tube is formed by a polymer extrusion process, the helical screw is formed by first polymer injection process, and the outlet end cap is formed by a second polymer injection molding process.

C3. The process of paragraph C1 or C2, further comprising coupling an inlet end cap to the first end of the auger tube, wherein inlet end cap is at least partially formed from a third polymer.

C4. The process of any one of paragraphs C1 to C3, wherein the inlet end cap is formed by a third polymer injection molding process.

C5. The process of any one of paragraphs C1 to C4, wherein securing the drive shaft to the helical screw comprises securing the first end of the drive shaft to a second end of the helical screw.

C6. The process of any one of paragraphs C1 to C5, wherein securing the drive shaft to the helical screw comprises molding the helical screw about the drive shaft by the first injection molding process.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Also, the naming convention used herein is not intended to distinguish between components that differ in name but not function. Furthermore, in the following discussion and in the claims, the terms "including" and "comprising" are used in an open-ended fashion, and thus should be interpreted to mean "including, but not limited to."

All numerical values in this disclosure are exact or approximate values ("about") unless otherwise specifically stated. Accordingly, various embodiments of the disclosure may debyte from the numbers, values, and ranges disclosed herein without departing from the intended scope.

What is claimed is:

1. A fluid pump, comprising: an auger tube having a first end and a second end; a helical screw having a first end, a second end, and a collar positioned toward the second end thereof; an outlet end cap having a first end that defines a longitudinal bore partially therethrough, a second end that defines an aperture therethrough and an outlet tube having a first end in fluid communication with the longitudinal bore defined by the first end of the outlet end cap; a drive shaft having a first end and a second end; a first bearing that defines a bore therethrough; a second bearing that defines a bore therethrough; and an adapter that defines a shoulder, wherein: the helical screw is disposed within the auger tube, the first end of the outlet end cap is coupled to the second end of the auger tube, the first bearing and the second bearing are each at least partially disposed within the aperture defined by the second end of the outlet end cap, the second end of the drive shaft extends at least partially through the bore defined by the first bearing and the bore defined by the second bearing, the drive shaft is coupled to the helical screw, the second end of the outlet end cap defines a first shoulder and a second shoulder, a first end of the adapter is configured to be coupled to the second end of the drive shaft and disposed at least partially within the bore defined by the second bearing, the first bearing is disposed between the collar of the helical screw and the first shoulder defined by the second end of the outlet end cap, the second bearing is disposed between the second shoulder defined by the second end of the outlet end cap and the shoulder defined by the adapter, the auger tube is formed from a first synthetic polymer, the helical screw is formed from a second synthetic polymer, and the outlet end cap is formed from a third synthetic polymer.

2. A process for manufacturing a fluid pump, comprising: forming an auger tube from a first synthetic polymer; forming a helical screw from a second synthetic polymer; forming an outlet end cap from a third synthetic polymer, obtaining a drive shaft having a first end and a second end, wherein the fluid pump comprises: the auger tube that comprises a first end and a second end, the helical screw that comprises a first end, a second end, and collar positioned toward the second end thereof, the outlet end cap that comprises a first end that defines a longitudinal bore partially therethrough, a second end that defines an aperture therethrough, a first shoulder, and a second shoulder, and an outlet tube having a first end in fluid communication with the longitudinal bore defined by the first end of the outlet end cap, a first bearing that defines a bore therethrough, a second bearing that defines a bore therethrough, and an adapter that defines a shoulder, coupling the drive shaft to the helical screw; coupling the first end of the outlet end cap to the second end of the auger tube; disposing the first bearing within the aperture defined by the second end of the outlet end cap; disposing the second bearing within the aperture defined by the second end of the outlet end cap; disposing the helical screw within the auger tube such that the first bearing is disposed between the collar of the helical screw and the first shoulder defined by the second end of the outlet end cap and the second end of the drive shaft extends at least partially through the bore defined by the first bearing and the bore defined by the second bearing; and coupling the first end of the adapter to the second end of the drive shaft such that the second bearing is disposed between the second shoulder defined by the second end of the outlet end cap and the shoulder defined by the adapter.

3. The process of claim 2, wherein:

the auger tube is formed by a polymer extrusion molding process, the helical screw is at least partially formed by a first polymer injection molding process, and the outlet end cap is at least partially formed by a second polymer injection molding process.

4. The process of claim 3, wherein securing the drive shaft to the helical screw comprises molding the helical screw at least partially about the drive shaft by an injection molding process.

5. The fluid pump of claim 1, wherein the first bearing is configured to restrain a movement of the drive shaft and helical screw relative to the outlet end cap and the auger tube in a direction from the first end of the auger tube toward the second end of the auger tube.

6. The fluid pump of claim 5, wherein the second bearing is configured to restrain a longitudinal movement of the drive shaft and the helical screw relative to the outlet end cap and the auger tube in a direction from the second end of the auger tube towards the first end of the auger tube.

7. The fluid pump of claim 6, wherein the second end of the adapter is configured to be connected to a powered rotary tool.

8. The fluid pump of claim 7, wherein:

the adapter defines a seal groove on an outer surface thereof and towards the first end thereof, the adapter further comprises a seal disposed at least partially within the seal groove, and the seal can be disposed between the outer surface of the adapter and an inner surface of the second bearing.

9. The fluid pump of claim 8, further comprising a discharge hose that is configured to be coupled to a second end of the outlet tube, wherein, when a first end of the discharge hose is coupled to the second end of the outlet tube, the first end of the auger tube is submerged in a body of a fluid, the outlet end cap and the discharge hose are filled with a portion of the body of the fluid, and a second end of the discharge hose is located at an elevation that is below an elevation of a surface of the body of the fluid, the helical screw is free to rotate relative to the auger tube as the fluid moves through the auger tube, the outlet end cap, the outlet tube, and the discharge hose.

10. The fluid pump of claim 9, further comprising an inlet end cap having a first end and a second end, wherein:

the inlet end cap defines a longitudinal bore therethrough, the second end of the inlet end cap is coupled to the first end of the auger tube, and a plurality of stand-off feet extends from the first end of the inlet end cap to define a plurality of fluid passages that permits a fluid to flow into the longitudinal bore defined by the inlet end cap when the plurality of stand-off feet abuts against a submerged surface.

11. The fluid pump of claim 10, wherein the inlet end cap is formed by a third polymer injection molding process.

12. A fluid pump, comprising: an auger tube having a first end and a second end; a helical screw having a first end and a second end; an outlet end cap having a first end that defines a longitudinal bore partially therethrough, a second end that defines an aperture therethrough, and an outlet tube having a first end in fluid communication with the longitudinal bore defined by the first end of the outlet end cap; an inlet end cap having a first end, a second end, and that defines a longitudinal bore therethrough; a drive shaft having a first end and a second end; a bearing that defines a bore therethrough; an adapter that defines a shoulder, wherein: the first end of the drive shaft is coupled to the second end of the helical screw, the helical screw is disposed within the auger tube, the first end of the outlet end cap is coupled to the second end of the auger tube, the second end of the inlet end cap is coupled to the first end of the auger tube, a plurality of stand-off feet extends from the first end of the inlet end cap to define a plurality of fluid passages that permits a fluid to flow into the longitudinal bore defined by the inlet end cap when the plurality of stand-off feet abuts against a submerged surface, the second end of the drive shaft extends at least partially through the bore defined by the bearing, the second end of the outlet end cap defines a shoulder, a first end of the adapter is configured to be coupled to the second end of the drive shaft and disposed at least partially within the bore defined by the bearing, the bearing is at least partially disposed within the aperture defined by the second end of the outlet end cap and between the shoulder defined by the second end of the outlet end cap and the shoulder defined by the adapter, and wherein: the auger tube is formed from a first synthetic polymer, the helical screw is formed from a second synthetic polymer, the outlet end cap is formed from a third synthetic polymer, and the inlet end cap is formed by a fourth synthetic polymer.

13. The fluid pump of claim 12, wherein the bearing is configured to resist a thrust force that is generated when the helical screw rotates within the auger tube while the first end of the auger tube is submerged in the fluid.

14. The fluid pump of claim 13 wherein the second end of the adapter is configured to interface with a powered rotary tool.

15. The fluid pump of claim 14, further comprising a discharge hose that is configured to be coupled to a second end of the outlet tube, wherein, when a first end of the discharge hose is coupled to the second end of the outlet tube, the first end of the auger tube is submerged in a body of a fluid, the outlet end cap and the discharge hose are filled with a portion of the body of the fluid, and a second end of the discharge hose is located at an elevation that is below an elevation of a surface of the body of the fluid, the helical screw is free to rotate relative to the auger tube as the fluid moves through the auger tube, the outlet end cap, the outlet tube, and the discharge hose.

16. The fluid pump of claim 15, wherein:

the adapter defines a seal groove on an outer surface thereof and towards the first end thereof, the adapter further comprises a seal disposed at least partially within the seal groove, and the seal can be disposed between the outer surface of the adapter and an inner surface of the bearing.

17. The fluid pump of claim 16, wherein:

the helical screw is formed by a first polymer injection molding process, the outlet end cap is formed by a second polymer injection molding process, and the auger tube is at least partially formed from a polymer extrusion process.

18. The fluid pump of claim 11, wherein a length of the drive shaft is greater than a length of the helical screw.

* * * * *